(12) United States Patent
Ishii et al.

(10) Patent No.: US 10,810,520 B2
(45) Date of Patent: Oct. 20, 2020

(54) TASK GENERATION FOR MACHINE LEARNING TRAINING DATA TASKS BASED ON TASK AND WORKER ASSOCIATIONS

(71) Applicant: Panasonic Intellectual Property Corporation of America, Torrance, CA (US)

(72) Inventors: Yasunori Ishii, Osaka (JP); Sotaro Tsukizawa, Osaka (JP); Masaki Takahashi, Osaka (JP); Reiko Hagawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 212 days.

(21) Appl. No.: 15/140,538

(22) Filed: Apr. 28, 2016

(65) Prior Publication Data
US 2016/0335116 A1    Nov. 17, 2016

(30) Foreign Application Priority Data
May 11, 2015    (JP) .................................. 2015-096910

(51) Int. Cl.
*G06Q 10/06* (2012.01)
*G06Q 10/10* (2012.01)
(Continued)

(52) U.S. Cl.
CPC ............. *G06Q 10/06* (2013.01); *G06F 9/468* (2013.01); *G06F 9/4843* (2013.01);
(Continued)

(58) Field of Classification Search
None
See application file for complete search history.

(56) References Cited

U.S. PATENT DOCUMENTS

2009/0132492 A1    5/2009   Satoh et al.
2016/0063394 A1*   3/2016   Gokalp ................ G06F 16/951
                                                            706/12
(Continued)

FOREIGN PATENT DOCUMENTS

JP    2008-033755    2/2008
JP    2009-070188    4/2009

*Primary Examiner* — Lewis A Bullock, Jr.
*Assistant Examiner* — Melissa A Headly
(74) *Attorney, Agent, or Firm* — Greenblum & Bernstein, P.L.C.

(57) ABSTRACT

A task generation method includes: receiving worker information from equipment of a worker over a network, the worker information including attribute information regarding a personal attribute of the worker; calculating degrees of association between each of pieces of analysis information resulting from analysis of pieces of data stored in a storage device connected to a computer and the worker information; extracting a piece of data to be subjected to task processing the worker is requested to perform from the pieces of data as specific data, based on the degrees of association; and generating a request task that is a task for making, to the equipment of the worker, a request for performing task processing for giving label information to the extracted specific data by using the equipment of the worker.

8 Claims, 12 Drawing Sheets

(51) Int. Cl.
*G06F 9/46* (2006.01)
*G06F 9/50* (2006.01)
*G06F 9/48* (2006.01)

(52) U.S. Cl.
CPC ......... *G06F 9/5005* (2013.01); *G06Q 10/101* (2013.01); *G06Q 10/103* (2013.01)

(56) References Cited

U.S. PATENT DOCUMENTS

2017/0024660 A1* 1/2017 Chen ..................... G06F 21/552
2017/0134508 A1* 5/2017 Kalis ....................... H04L 67/18

* cited by examiner

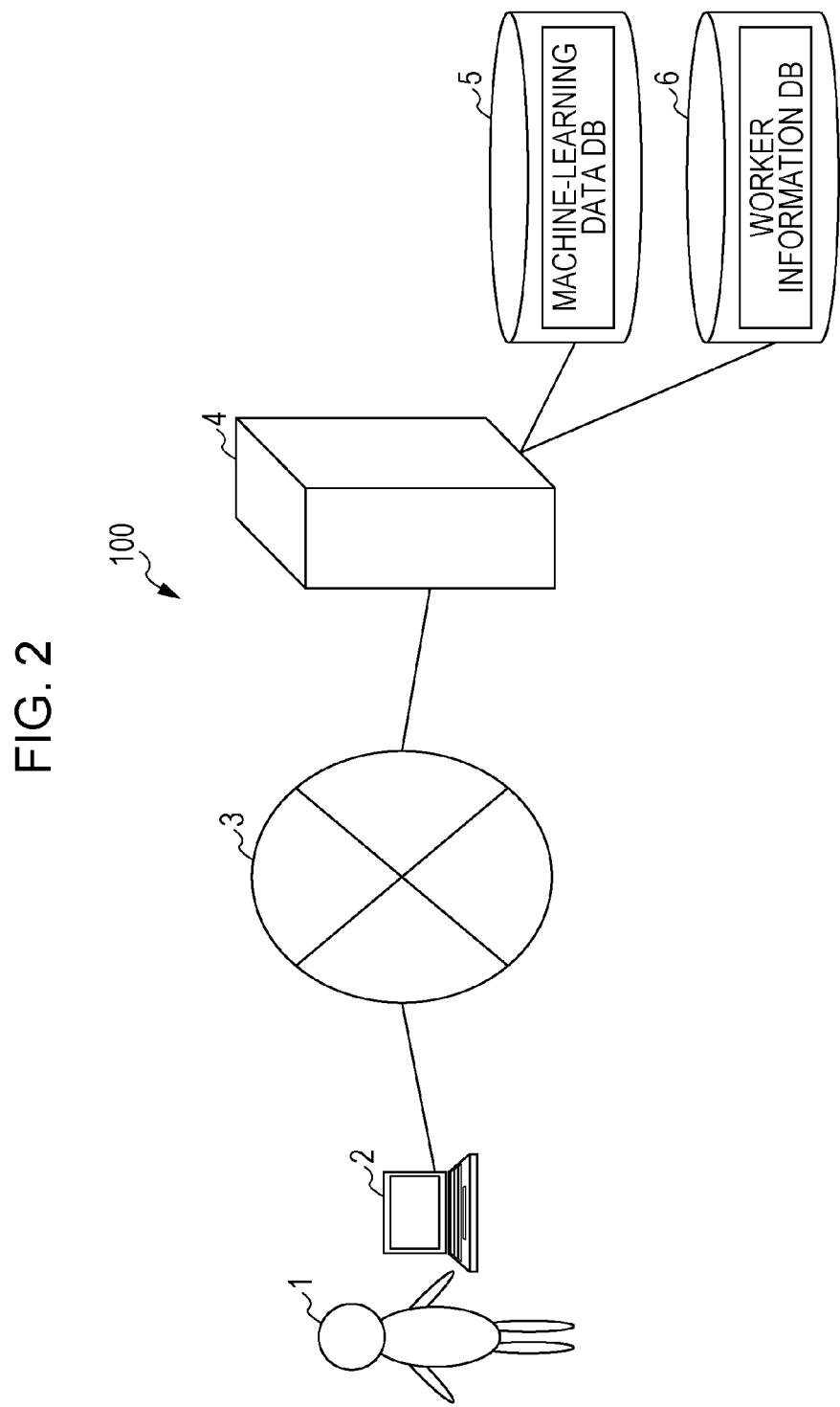

FIG. 10
Please enter your address.
Postal code
Address
FIG. 11
Select the image that you think corresponds to X.
Ta  Tb  Tc
○  ○  ○
FIG. 12
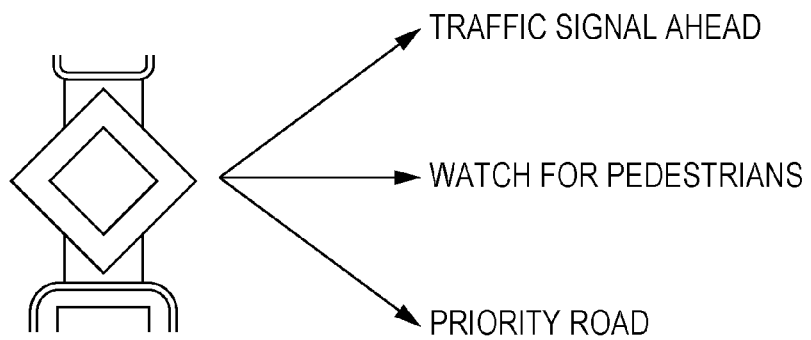
→ TRAFFIC SIGNAL AHEAD
→ WATCH FOR PEDESTRIANS
→ PRIORITY ROAD
FIG. 13
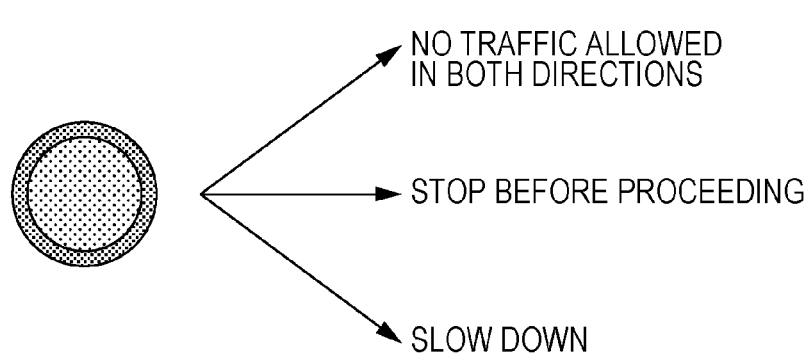
→ NO TRAFFIC ALLOWED IN BOTH DIRECTIONS
→ STOP BEFORE PROCEEDING
→ SLOW DOWN

TASK GENERATION FOR MACHINE LEARNING TRAINING DATA TASKS BASED ON TASK AND WORKER ASSOCIATIONS

BACKGROUND

1. Technical Field

The present disclosure relates to task generation methods, task generation apparatuses, and non-transitory computer-readable recording media storing programs. In particular, the present disclosure relates to, in a system in which a request for performing task processing is made to a plurality of workers, a task generation method, a task generation apparatus, and a non-transitory computer-readable recording medium storing a program.

2. Description of the Related Art

In recent years, a technique in which a computer is given one piece of data (data A) and is made to predict data (data B) corresponding to the piece of data has attracted attention. For example, this technique makes it possible to predict the location or the type of object included in an image on the basis of the image and to predict characters or a translated sentence of sound on the basis of the sound. In addition, for example, this technique makes it possible to predict what is meant or intended by characters on the basis of the characters and to predict a next book or the like one is likely to purchase on the basis of the purchase history of books.

In order to perform such prediction, machine learning is available as a technique for making a computer learn the association between data A and data B.

The "machine learning" as used herein refers to a technique for making a computer learn a regularity and/or a law on the basis of a certain number of pieces of training data or more. It has been known that the accuracy of the machine learning improves when a large amount of data (big data) is provided as the training data.

One method for collecting big data is a method utilizing outsourcing to third parties, such as crowdsourcing. Crowdsourcing is a system in which a request for performing simple work (a simple task) is made to a large number of unspecified people (workers) through the Internet at low cost. Thus, when crowdsourcing is used, a request for performing tasks for individual pieces of data constituting big data can be made to a large number of workers in a distributed manner, and thus the big data can be collected efficiently (at relatively low cost in a short period of time).

However, it is known that there are significant variations in the qualities of task deliverables (task processing results) obtained by the current crowdsourcing. That is, the task processing results obtained by the crowdsourcing have significant variations. Consequently, there is a problem in that it is also difficult to enhance the accuracy of the machine learning when big data including task processing results having significant variations is used.

SUMMARY

One non-limiting and exemplary embodiment provides, in a system in which a request for performing task processing is made to a plurality of workers, a task generation method, a task generation apparatus, and a non-transitory computer-readable recording medium storing a program, the method, the apparatus, and the program making it possible to suppress variations in the qualities of results of task processing performed by the workers.

In one general aspect, the techniques disclosed here feature a task generation method using a computer included in a system in which a request for performing task processing is made to equipment of a worker who is a processing-undertaking side. The task generation method includes: receiving worker information from the equipment of the worker over a network, the worker information including attribute information regarding a personal attribute of the worker; calculating degrees of association between each of pieces of analysis information resulting from analysis of pieces of data stored in a storage device connected to the computer and the worker information; extracting a piece of data to be subjected to the task processing the worker is requested to perform from the pieces of data as specific data, based on the degrees of association; and generating a request task that is a task for making, to the equipment of the worker, a request for performing task processing for giving label information to the extracted specific data by using the equipment of the worker.

According to the present disclosure, it is possible to suppress variations in the amount of time taken for task processing performed by respective workers and variations in the qualities of task processing results obtained from the respective workers.

It should be noted that general or specific embodiments may be implemented as a system, an apparatus, a device, a method, an integrated circuit, a computer program, a computer-readable storage medium such as a compact disc read-only memory (CD-ROM), or any selective combination thereof.

Additional benefits and advantages of the disclosed embodiment will become apparent from the specification and drawings. The benefits and/or advantages may be individually obtained by the embodiment and features of the specification and drawings, which need not all be provided in order to obtain one or more of such benefits and/or advantages.

BRIEF DESCRIPTION OF THE DRAWINGS

FIG. 2 is a diagram illustrating one example of a system in which a request for performing task processing is made to a worker in the embodiment;

FIG. 10 illustrates one example of an input screen of worker information of a worker in the embodiment;

FIG. 11 illustrates one example of a selection screen with which a worker performs task processing in the embodiment;

FIG. 12 illustrates one example of the selection screen with which the worker performs task processing in the embodiment;

FIG. 13 illustrates one example of the selection screen with which the worker performs task processing in the embodiment;

Figure 1A:
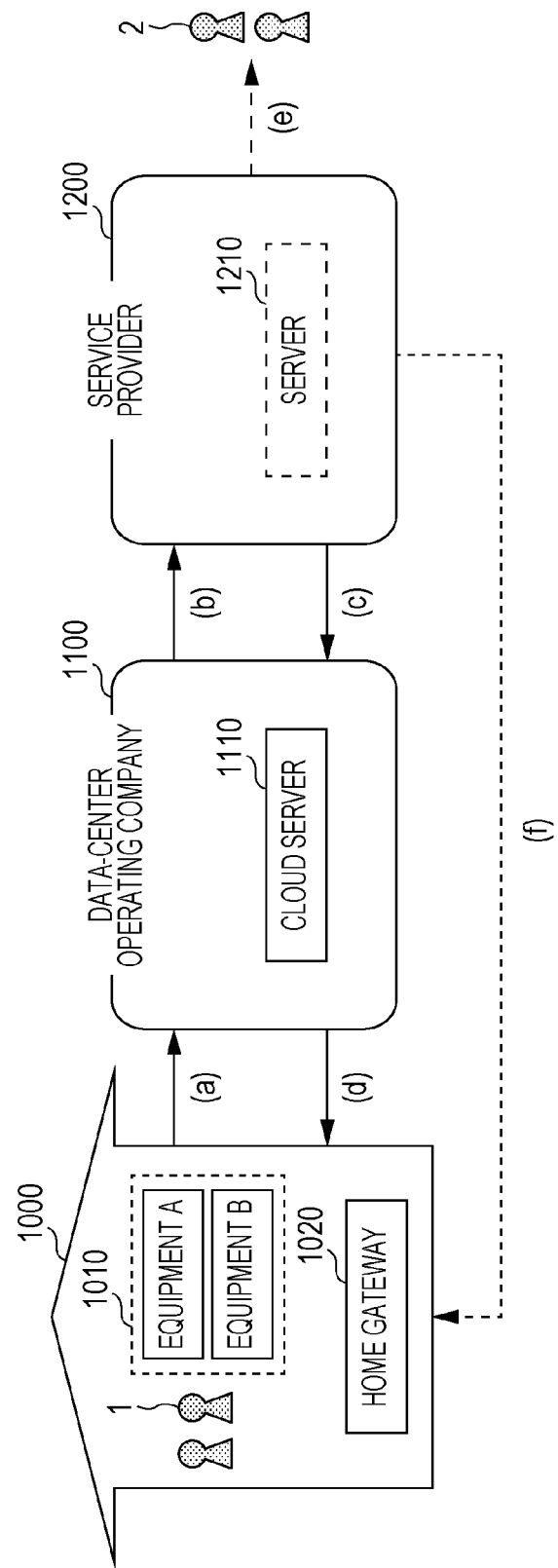
FIG. 1A is a diagram illustrating an overview of an information providing system in an embodiment.

DETAILED DESCRIPTION (Background that LED to Aspect According to Present Disclosure)

As described above, the accuracy of machine learning improves when big data is provided as training data. When big data is collected using the current crowdsourcing, task processing results (deliverables) obtained by the current crowdsourcing have significant variations. Consequently, even when the big data is collected using the crowdsourcing, there is a problem in that it is difficult to enhance the accuracy of the machine learning, since the individual pieces of data (task processing results) have large variations.

In this case, the big data used for the machine learning is, for example, a large amount of sample data (training data), such as a large number of background images or a large number of human images. For example, in order to allow machine learning of a regularity, a law, or the like to be performed with high accuracy on the basis of big data, training data to which correct-answer information (label information) is given is used. When the training data is an image, the label information indicates, for example, a result of determination of the image, a result of classification of the image, or whether or not the image shows a human. In addition, people need to determine the contents of the label information. Thus, giving the label information to the training data is work performed by people (workers).

However, since the crowdsourcing is a system in which a request for performing task processing is made to a large number of unspecified workers over the Internet, some of the workers have little knowledge about the training data and are unable to perform processing (task processing) for giving correct label information, thus causing significant variations in the task processing results obtained from the individual workers.

As described above, since crowdsourcing is a system in which a request for performing simple work (a simple task) is made to an unspecified large number of people (workers) over the Internet at low cost, it is possible to make a request for performing work (a task) to workers all over the world over the Internet.

However, for example, when the training data is an image, one who has received the request for the work (task), which may be simple work though, cannot give correct label information to information included in the image, unless he or she can determine what is meant by the information included in the image.

For example, it is assumed that the image includes a traffic sign, and the work is to give, as the label information, information meant by the traffic sign.

Traffic signs are uniquely defined in each country. Thus, it can be thought that one who lives in one country (hereinafter referred to as a "first country") can easily understand traffic signs in the first country. Accordingly, for example, it can be thought that work for giving corresponding label information to a traffic sign in the first country, the sign being included in the image, is simple work for ones who live in the first country.

However, it can be thought that, if the request for the work for giving, as the label information, the information meant by the traffic sign in the first country is made to one who lives in another country (hereinafter referred to as a "second country") different from the first country, the one (the worker) who has received the request cannot correctly give the label information. This may be due to a case in which the one who lives in the second country has no knowledge about traffic signs in the first country.

Such a case is not limited to only the work for giving corresponding label information to a traffic sign included in an image.

That is, it can be thought that, if a request for work for giving label information to information included in training data is made to one who has little knowledge about the information (or, also referred to as "knowledge about training data"), the one who has received the work request cannot correctly give the label information.

Thus, there is a conceivable countermeasure in which workers who have little knowledge about the training data and are unable to give the correct label information are advised to give the correct label information even when it takes time. With this countermeasure, when the work for giving the label information to each of a plurality of pieces of training data is shared by a plurality of workers, it is possible to suppress variations in the qualities of task processing results obtained from the workers.

However, when this countermeasure is taken, there is a possibility that the request cannot be made to the workers at low cost. For example, the amount of work time taken for a worker who has no knowledge about the training data to give the correct label information is larger than the amount of work time taken for a worker who has knowledge about the training data. Thus, of the plurality of workers, workers who have no knowledge about the training data may determine that the current reward is low for the work time, and thus there is a possibility that they do not accept the request for the work (task processing).

Accordingly, in order to reduce the reward (fee) given to workers and the work time of workers, the present inventor(s) has conceived that, if a request for work for processing (task processing) for giving correct label information to training data can be made to workers who seem to have knowledge about the training data, the workers can give the correct label information to the training data in a short period of time, thus reducing the number of cases in which the request for the work (task processing) is declined for the reason that the amount of time taken for the work is large for the reward.

For example, Japanese Patent No. 4891691 discloses a method in which information associated with location information, such as an address and longitude and latitude, is presented based on the location information. Japanese Patent No. 4891691, however, discloses merely a technique for searching for an image associated with the location information and thus cannot be applied to a method for allocating tasks in crowdsourcing.

One non-limiting and exemplary embodiment provides, in a system in which a request for performing task processing is made to workers, a task generation method and so on that can suppress variations in the amounts of time taken for the workers to perform the task processing and variations in the qualities of task processing results obtained from the respective workers.

In one general aspect, the techniques disclosed here feature a task generation method using a computer included in a system in which a request for performing task processing is made to equipment of a worker who is a processing-undertaking side. The task generation method includes: receiving worker information from the equipment of the worker over a network, the worker information including attribute information regarding a personal attribute of the worker; calculating degrees of association between each of pieces of analysis information resulting from analysis of pieces of data stored in a storage device connected to the computer and the worker information; extracting a piece of data to be subjected to the task processing the worker is requested to perform from the pieces of data as specific data, based on the degrees of association; and generating a request task that is a task for making, to the equipment of the worker, a request for performing task processing for giving label information to the extracted specific data by using the equipment of the worker.

This makes it possible to realize a task generation method that suppresses variations in the amounts of time taken for respective workers to perform task processing by using equipment and variations in the qualities of task processing results obtained from the respective workers.

For example, each of the pieces of data may be data for machine learning (the data may herein be referred to as "machine-learning data"), and the label information may include label information to the piece of machine-learning data corresponding to the extracted piece of data as the specific data.

For example, the task generation method may further include transmitting the generated request task to the equipment of the worker.

For example, the generated request task may include a piece of machine-learning data corresponding to the extracted piece of data as the specific data, a plurality of pieces of label candidate information for machine learning, the plurality of pieces of label candidate information being prepared based on a piece of analysis information resulting from analysis of the piece of machine-learning data, and selection information for making the worker select one of the pieces of label candidate information by using the equipment of the worker and give the selected piece of label information as the label information, to the piece of machine-learning data corresponding to the specific data.

For example, in the extracting of the data, the number of times each of the pieces of machine-learning data was used to generate a request task in the past may be checked, and one of the pieces machine-learning data whose number of usages is a smaller than a predetermined number and that corresponds to one of the pieces of analysis information whose degree of association with the worker information is larger than a predetermined threshold may be extracted as the specific data.

For example, the personal attribute may include at least one of location information of the worker or the equipment when the worker accessed the computer by using the equipment, an address, an occupation, an age, and a gender of the worker.

For example, the personal attribute may include at least one of access history of the worker about access to a predetermined web accessible by the computer and upload history of the worker about uploading data to a predetermined social networking service (SNS).

For example, the personal attribute may include location information of the worker when the worker or the equipment accessed the computer by using the equipment or information regarding an address of the worker; at least one of the pieces of analysis information may include information regarding a location where the corresponding piece of machine-learning data was obtained; and in the calculating of the degrees of association, at least one of the degrees of association may be calculated based on a distance calculated using the location information or information regarding the address and the location where the machine-learning data corresponding to the at least one of the pieces of analysis information was obtained.

For example, in the calculating of the degrees of association, the at least one of the degrees of association may be calculated to be higher as the distance decreases.

For example, the personal attribute may include age information regarding an age of the worker; at least one of the pieces of analysis information may include age information regarding an age of a person included in the corresponding piece of machine-learning data; and in the calculating of the degrees of association, at least one of the degrees of association may be calculated based on the age information included in the personal information and the age information included in the at least one of the pieces of analysis information.

For example, in the calculating of the degrees of association, the at least one of the degrees of association is calculated to be higher for a smaller difference between the age of the worker and the person's age indicated by the age information included in the at least one of the pieces of analysis information.

For example, the personal attribute may include gender information regarding a gender of the worker; at least one of the pieces of analysis information may include gender information regarding a gender of a person included in the corresponding piece of machine-learning data; and in the calculating of the degrees of association, at least one of the degrees of association may be calculated based on the gender information included in the personal attribute and the gender information included in the at least one of the pieces of analysis information.

For example, the analysis information may include pieces of gender information regarding genders of respective people included in the corresponding piece of machine-learning data; and in the calculating of the degrees of association, at least one of the degrees of association may be calculated to be higher, as the number of matches between the worker's gender indicated by the gender information included in the personal attribute and the people's genders indicated by the pieces of gender information included in at least one of the pieces of analysis information increases.

For example, each of the pieces of machine-learning data may include one of image data, sound data, and text data; the pieces of machine-learning data and pieces of location information each of which indicates a location where the corresponding piece of machine-learning data was obtained may be stored in the storage device in association with each other; and each of the pieces of analysis information may include the location information.

For example, at least one of the pieces of machine-learning data may be image data; and one of the pieces of analysis information corresponding to the image data may include information indicating a type of an object included in the image data or information indicating a location of the object, the information being obtained by performing image recognition processing on the image data.

For example, at least one of the pieces of machine-learning data may be sound data; and one of the pieces of analysis information corresponding to the sound data may include at least one of information regarding an object or a person that makes sound included in the sound data and information indicating a language used by the person who makes sound included in the sound data, the information being obtained by performing sound recognition processing on the sound data.

For example, at least one of the pieces of machine-learning data may be text data; and one of the pieces of analysis information corresponding to the text data may include information indicating a language of the text data, the information being obtained by performing character recognition processing on the text data.

A task generation apparatus according to one aspect of the present disclosure is a task generation apparatus included in a system in which a request for performing task processing is made to a worker who is a processing-undertaking side. The task generation apparatus includes: a receiver that receives worker information from the equipment of the worker over a network, the worker information including attribute information regarding a personal attribute of the worker; a calculator that calculates degrees of association between each of pieces of analysis information resulting from analysis of pieces of data stored in a storage device connected to the computer and the worker information of the worker; an extractor that extracts a piece of data to be subjected to task processing the worker is requested to perform from the pieces of data as specific data, based on the degrees of association; and a generator that generates a request task that is a task for making, to the equipment of the worker, a request for performing task processing for giving label information to the extracted specific data by using the equipment of the worker.

It should be noted that general or specific embodiments may be implemented as a system, an apparatus, a device, a method, an integrated circuit, a computer program, a computer-readable storage medium such as a CD-ROM, or any selective combination thereof.

(Overview of Service)

As a method for collecting big data, there is a method utilizing information input by users, other than a method utilizing outsourcing to third parties, such as crowdsourcing. A description below will be given of an overview of a method for collecting big data.

FIG. 1A illustrates an overview of a system in an embodiment.

A group 1000 is, for example, a company, an entity, or a household, and the scale thereof is not limited. At the group 1000, a plurality of pieces of equipment 1010, including equipment A and equipment B, and a home gateway 1020 are provided. The pieces of equipment 1010 include equipment that can connect to the Internet (e.g., a smartphone, a personal computer (PC), and a television (TV)) and equipment that is incapable of connecting to the Internet on their own (e.g., lighting equipment, a washing machine, and a refrigerator). The pieces of equipment 1010 may also include equipment that is incapable of connecting to the Internet on their own but that can connect to the Internet via the home gateway 1020. Also, the group 1000 includes users 1 of the pieces of equipment 1010.

A data-center operating company 1100 has a cloud server 1110. The cloud server 1110 is a virtualization server that cooperates with various types of equipment through the Internet. The cloud server 1110 mainly manages, for example, big data that is difficult to process with a typical database management tool or the like. The data-center operating company 1100 performs data management, management of the cloud server 1110, operations of a data center that performs the management, and so on. Details of a service provided by the data-center operating company 1100 are described later.

Figure 1B:
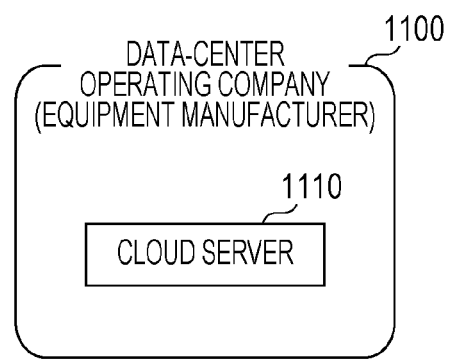
FIG. 1B is a diagram illustrating a modification of a partial configuration of the information providing system in the embodiment.
Figure 1C:
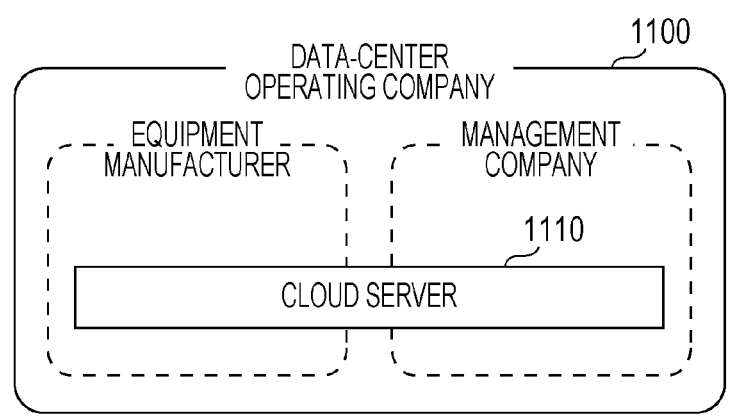
FIG. 1C is a diagram illustrating a modification of a partial configuration of the information providing system in the embodiment.

In this case, the data-center operating company 1100 is not limited to a company that performs only data management, operations of the cloud server 1110, or the like. For example, when an equipment manufacturer that develops and manufactures one type of equipment of the pieces of equipment 1010 also performs data management, management of the cloud server 1110, and so on, this equipment manufacturer corresponds to the data-center operating company 1100 (FIG. 1B). The data-center operating company 1100 is not limited to a single company. For example, when the equipment manufacturer and another management company perform data management and operation of the cloud server 1110 in cooperation with each other or in a shared manner, one of or both the equipment manufacturer and the other management company correspond(s) to the data-center operating company 1100 (FIG. 1C).

A service provider 1200 has a server 1210. The scale of the server 1210 as used herein is not limited, and examples include a memory in a PC or the like. The service provider 1200 may or may not have the server 1210.

In the service described above, the home gateway 1020 is not essential. For example, when the cloud server 1110 performs all data management, the home gateway 1020 is not necessary. There are also cases in which the pieces of equipment 1010 do not include any equipment that is incapable of connecting to the Internet on their own, as in a case in which all kinds of equipment in a home are connected to the Internet.

Next, a description will be given of a flow of information in the aforementioned service.

First, the equipment A or B in the group 1000 transmits log information to the cloud server 1110 in the data-center operating company 1100. The cloud server 1110 aggregates the log information of the equipment A or B (as indicated by (a) in FIG. 1A). In this case, the term "log information" refers to, for example, information indicating operation states, operation dates and times, and so on of the pieces of equipment 1010. Examples of the log information include the viewing history of a television, video-recording-reservation information of a recorder, the operation date and time of a washing machine, the amount of laundry thereof, the opening/closing date and time of a refrigerator door, and the number of times it was opened/closed. The log information, however, is not limited to those pieces of information and refers to any information that can be obtained from any kind of equipment. The log information may also be directly supplied from the pieces of equipment 1010 to the cloud server 1110 through the Internet. The log information from the pieces of equipment 1010 may also be temporarily aggregated in the home gateway 1020 and be supplied from the home gateway 1020 to the cloud server 1110. The log information may also be a result (a task processing result) of simple work (a simple task) provided from the cloud server 1110 and performed by a user. In this case, the pieces of the equipment 1010 may be operated by the users 1.

Next, the cloud server 1110 in the data-center operating company 1100 supplies the aggregated log information to the service provider 1200 in a certain unit of information. The certain unit of information may be a unit with which the data-center operating company 1100 can organize the aggregated information and can supply it to the service provider 1200 or may be a unit requested by the service provider 1200. The log information may also be provided in a unit other than the certain unit of information, and there are also cases in which the amount of information provided changes depending on the situation. The log information is stored in the server 1210 of the service provider 1200, as appropriate (as indicated by (b) in FIG. 1A). The service provider 1200 may then organize the log information into information that suits a service to be provided to users, and may provide the service to users. The service provider 1200 may organize task processing results collected from other users and may supply, as machine-learning big data, the organized task processing results to a requester who has requested collecting big data. The users to which the information is provided may be the users 1 of the plurality of pieces of equipment 1010 or may be outside users 2. A method for providing the service to the users may be, for example, a method in which the service is directly supplied from the service provider 1200 to the users (as indicated by (e) in FIG. 1A). For example, the method for supplying the service to the users may be, for example, a method in which the service is supplied to the users after going through the cloud server 1110 in the data-center operating company 1100 again (as indicated by (c) and (d) in FIG. 1A). The cloud server 1110 in the data-center operating company 1100 may also organize the log information into information that suits the service to be presented to the users, and may provide the service to the service provider 1200.

The users 1 and the users 2 may be the same or may be different from each other. The users 2 may be requesters who make a request for collecting the machine-learning big data.

A task generation method and so on according to one aspect of the present disclosure will be described below in detail with reference to the accompanying drawings. The embodiment described below represents a specific example of the present disclosure. Numerical values, shapes, materials, constituent elements, the arrangement positions of the constituent elements, and so on described in the embodiment below are merely examples and are not intended to limit the present disclosure. Of the constituent elements in the embodiment described below, constituent elements not set forth in the independent claims that represent the broadest concept will be described as optional constituent elements.

Embodiment

Overall Configuration of System

FIG. 2 is a diagram illustrating one example of a system in which a request for performing task processing is made to a worker in the present embodiment. A system 100 illustrated in FIG. 2 includes equipment 2 used by a worker 1, a task generation apparatus 4 connected to the equipment 2 over a network 3 such as the Internet, and storage devices 5 and 6.

In the system 100, the task generation apparatus 4 is, for example, equipment used for crowdsourcing and is, for example, equipment used by one (also referred to as a "processing-requesting side") who makes a request for performing task processing for giving label information to data for machine learning (this data may herein be referred to as "machine-learning data").

The task generation apparatus 4 is connected to the storage devices 5 and 6. This connection may be a wireless connection or may be a wired connection.

The equipment 2 is, for example, equipment used by one (also referred to as a "processing-undertaking side") who accepts the request for performing the task processing. The processing-undertaking side is also referred to as a "worker".

The storage device 5 stores, for example, a machine-learning data database (DB) therein. The machine-learning data DB contains, for example, a plurality of pieces of machine-learning data. With respect to each of the pieces of machine-learning data, details of the task processing for giving the label information to the piece of machine-learning data are pre-determined. It is assumed that one who has knowledge about information included in the machine-learning data can relatively easily give the label information to the machine-learning data.

The storage device 6 stores a worker information DB therein. The worker information DB contains worker information regarding the worker 1 who accepts the request for performing the task processing. When the number of workers who receive the request for performing the task processing is two or more, the worker information DB contains pieces of worker information for the respective workers.

The task generation apparatus 4 pre-identifies a worker (e.g., the worker 1) that can accept the request for performing the task processing. The task generation apparatus 4 extracts machine-learning data having a high degree of association with the worker 1 from the pieces of machine-learning data as specific data and generates a request task for making a request for performing the task processing for giving label information to the specific data. Details of the specific data extraction are described later.

The machine-learning data having a high degree of association with the worker 1 is, for example, machine-learning data to be subjected to task processing in which the worker 1 can relatively easily give label information.

The task generation apparatus 4 transmits the request task to the equipment 2 over the network in order to make the worker 1 perform the task processing.

By using the equipment 2, the worker 1 performs the requested task processing and transmits a result (a task processing result), obtained by performing the task processing, to the task generation apparatus 4 over the network.

The task generation apparatus 4 receives the task processing result from the equipment 2 and stores the received task processing result in the storage device 5 in association with the machine-learning data corresponding to the specific data. The task processing result associated with the machine-learning data corresponding to the specific data may also be stored as label information (also referred to as correct-answer information) for the machine-learning data.

In the above-described example, the task generation apparatus 4 extracts, from the pieces of machine-learning data as the specific data, at least one of the pieces of machine-learning data to be subjected to the task processing in which a worker can relatively easily give label information. The task generation apparatus 4 transmits, to the equipment 2, a request for performing the task processing for giving label information to the extracted specific data. Thus, it can be expected that the worker who uses the equipment 2 can relatively easily perform the task processing for which the request was received.

That is, since it can be expected that the worker can give the label information in a short period of time, it can be expected that the number of cases in which a request for performing task processing is declined for the reason that it takes a long time to perform the task processing decreases.

A more detailed description will be given below.

[Workers]

The worker 1 is, for example, a worker in crowdsourcing. In the present embodiment, a request task for making a request for performing task processing is transmitted from the task generation apparatus 4 of the processing-requesting side to the equipment 2 over the network 3. The worker 1 performs the task processing by using the equipment 2.

[Equipment]

The equipment 2 is used by the worker 1 and is, for example, a smartphone, a tablet computer, or a personal computer. One example of a detailed configuration of the equipment 2 is described later with reference to FIG. 3. Although the example in FIG. 2 illustrates a configuration in which the equipment 2 connects to the network 3, the present disclosure is not limited thereto. For example, the present disclosure may be realized by a configuration in which a plurality of pieces of equipment is connected to the network 3 and each of the pieces of equipment connects to the task generation apparatus 4 through the network 3. Each of the pieces of equipment may also be used by a different worker.

Figure 3:
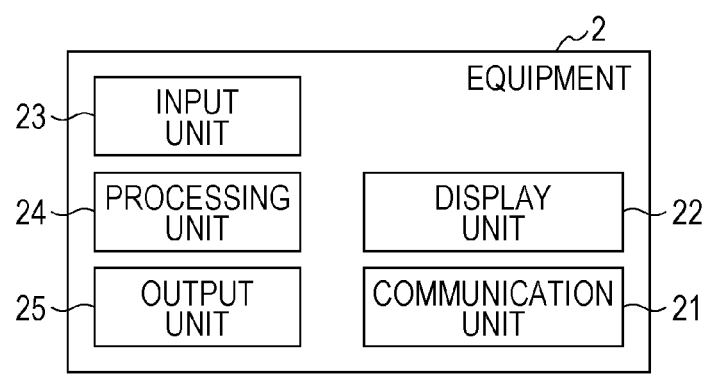
FIG. 3 is a diagram illustrating one example of a detailed configuration of equipment in the present embodiment.

FIG. 3 is a diagram illustrating one example of a detailed configuration of the equipment 2 in the present embodiment.

As illustrated in FIG. 3, the equipment 2 includes, for example, a communication unit 21, a display unit 22, an input unit 23, a processing unit 24, and an output unit 25.

The communication unit 21 receives a request task, which is a task for requesting the worker 1 to perform task processing, from the task generation apparatus 4 over the network 3. For example, by using the input unit 23, the worker 1 performs input for causing the processing unit 24 to perform processing for the received request task. The processing unit 24 performs processing (task processing) based on the input for the request task, the input being received from the input unit 23, and outputs a result of the task processing to the communication unit 21. The communication unit 21 transmits the task processing result, which is the result of the task processing that the worker 1 performed for the request task, to the task generation apparatus 4 over the network 3. The communication unit 21 has, for example, a hardware configuration including a communication circuit.

The display unit 22 displays a request task on display equipment (not illustrated) included in the equipment 2 or a display screen of display equipment connected to the equipment 2.

The input unit 23 is, for example, an input device. Examples of the input device include a keyboard and a mouse. When the display screen of the display equipment is a touch panel display, the input unit 23 may be a touch panel.

The input unit 23 receives, for example, an input from the worker 1. Examples of the input from the worker 1 include an input for processing for a request task received by the communication unit 21 and an input of worker information of the worker 1.

The worker information of the worker 1 includes, for example, information (attribute information) regarding personal attributes of the worker 1. The attribute information of the worker 1 includes, for example, at least one of the address, occupation, age, and gender of the worker 1, and information regarding the location information of the worker 1 when the worker 1 accessed the task generation apparatus 4.

For example, when an identifier (ID) and a password are required when the worker 1 accesses the task generation apparatus 4, the worker information of the worker 1 may include information, such as an ID and a password, used when the worker 1 accesses the task generation apparatus 4.

The worker information of the worker 1 may also include information, such as an ID and a password, used when the worker 1 accesses predetermined web information provided by a server apparatus (not illustrated).

The worker information of the worker 1 may also include information, such as an ID and a password, used when the worker 1 accesses a predetermined social networking service (SNS) provided by a server apparatus (not illustrated).

The input for processing for the request task, the input being received by the input unit 23, is output to the processing unit 24.

The worker information of the worker 1 which was received by the input unit 23 is output to, for example, the communication unit 21, from which the worker information is transmitted to the task generation apparatus 4 over the network 3.

Alternatively, for example, the worker information of the worker 1 which was received by the input unit 23 may be output to the processing unit 24, and after necessary processing is performed in the processing unit 24, the worker information may be output therefrom to the communication unit 21. In this case, the necessary processing performed by the processing unit 24 is, for example, encrypting the input worker information of the worker 1 to convert the input worker information of the worker 1 into a data format that can be easily processed by the task generation apparatus 4. Upon receiving the worker information of the worker 1, the task generation apparatus 4 stores the worker information in a worker information DB 61.

For example, when the worker 1 uses the task generation apparatus 4 for the first time or when it is necessary, the worker 1 may enter the worker information by using the equipment 2.

For example, when the attribute information of the worker 1 includes the location information of the worker 1 when the worker 1 accesses the task generation apparatus 4, the worker 1 may transmit the location information of the worker 1 to the task generation apparatus 4 as the attribute information of the worker 1 when the worker 1 accesses the task generation apparatus 4.

The processing unit 24 displays a request task, received by the communication unit 21, on the display unit 22 and/or processes an input from the worker 1 which was received by the input unit 23. In the present embodiment, the processing unit 24 executes task processing of the worker 1 with respect to the request task and generates a task processing result.

The output unit 25 outputs the task processing result, generated by the processing unit 24, to the communication unit 21.

The equipment 2 has a hardware configuration including, for example, a processor (not illustrated) and a memory (not illustrated). The memory is, for example, a recording medium, such as a semiconductor memory or a hard disk. For example, programs for realizing the functions of the display unit 22, the processing unit 24, and the output unit 25 are recorded in the memory. In the equipment 2, for example, the processor executes the programs to thereby cause the display unit 22, the processing unit 24, and the output unit 25 to function.

The equipment 2 may have a configuration using an integrated circuit in which the functions of the display unit 22, the processing unit 24, and the output unit 25 are incorporated.

Alternatively, the equipment 2 may have, for example, a configuration that includes a processor (not illustrated) and a memory (not illustrated) and in which a program for causing at least one of the display unit 22, the processing unit 24, and the output unit 25 to function is stored in the memory, and the other unit(s) is (are) implemented using an integrated circuit.

In the example illustrated in FIG. 1A, the equipment 2 corresponds to the equipment 1010 described above.

[Storage Devices]

Figure 4:
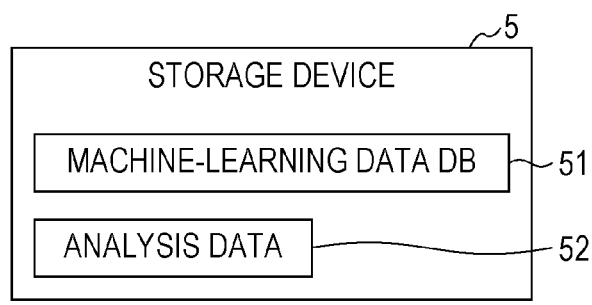
FIG. 4 illustrates one example of a detailed configuration of a storage device in the embodiment.
Figure 5:
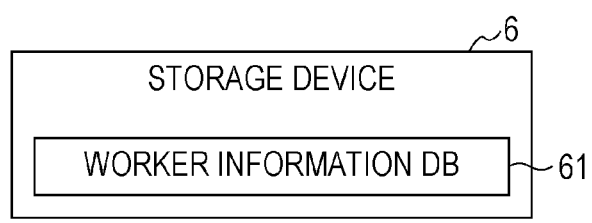
FIG. 5 illustrates one example of a detailed configuration of a storage device in the embodiment.
Figure 6:
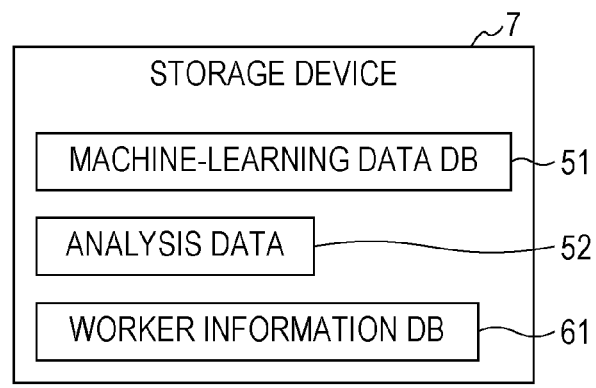
FIG. 6 illustrates another example of a detailed configuration of a storage device in the embodiment.

FIGS. 4 and 5 are diagrams illustrating examples of detailed configurations of the storage devices in the present embodiment. FIG. 6 is a diagram illustrating another example of a detailed configuration of the storage device in the present embodiment.

The storage device 5 can be accessed by the task generation apparatus 4 and stores therein a machine-learning data DB 51 and analysis data 52.

The machine-learning data DB 51 contains machine-learning big data desired by a processing-requesting side. The machine-learning big data is a collection of pieces of machine-learning data. Each piece of machine-learning data may also be referred to as "training data". Each piece of machine-learning data may be constituted by one of image data, sound data, and text data or may be constituted by any combination thereof.

For example, with respect to a worker who received a request for performing task processing for any of those pieces of data, this piece of data and a task processing result corresponding to a result obtained by performing the task processing on the piece of data may be contained in the machine-learning data DB 51 in association with each other.

Pieces of location information indicating the locations where the respective pieces of machine learning data are obtained may also be contained in the machine-learning data DB 51 in conjunction with the pieces of machine learning data.

The location indicated by each piece of location information includes, for example, information represented using a postal code, country, prefecture or state, city, town, village, address, latitude and longitude, or the like.

For example, when one of the pieces of data is image data, the location of a subject included in the image data or information indicating the location where a subject was photographed corresponds to the location information.

For example, when one of the pieces of data is sound data, information indicating the location where the sound data was recorded corresponds to the location information of the location where the sound data was obtained.

For example, when one of the pieces of data is text data, information indicating the location where the text data was created corresponds to the location information of the location where the text data was obtained.

The analysis data 52 is pieces of information resulting from analysis of the pieces of machine-learning data in the machine-learning data DB 51. Each of the pieces of machine-learning data is, for example, analyzed in advance.

For example, the system 100 may include an analyzing apparatus (not illustrated) for analyzing each of the pieces of machine-learning data contained in the machine-learning data DB 51. For example, the task generation apparatus 4 may have the analyzing apparatus. Since the present embodiment can be realized as long as there are the analysis data 52 and the machine-learning data DB 51, the analyzing apparatus does not necessarily have to be included in the system 100 in the present embodiment.

The analyzing apparatus analyzes each of the pieces of machine-learning data and stores, in the analysis data 52, analysis information corresponding to the result of the analysis. The result of the analysis is, for example, information regarding the contents of the corresponding piece of machine-learning data.

When the piece of machine-learning data is image data, the piece of analysis information corresponding to the image data is, for example, information regarding a person or object included in the image. The information regarding a person is, for example, information regarding the age, the gender, and so on of the person included in the image. The information regarding an object is, for example, information regarding the type of object (such as a traffic sign, building, or the like) included in the image. The analyzing apparatus can obtain these pieces of information, for example, by analyzing the image data through use of existing image recognition processing.

For example, when the analyzing apparatus can identify the place of a person or an object included in an image, the occupation or preference of the person, or the like by analyzing the clothes of the person, the object, or a background included in the image through use of existing image recognition processing, the piece of analysis information may further include these pieces of information.

When the piece of machine-learning data is sound data, the piece of analysis information corresponding to the sound data is, for example, information regarding a person or object that makes sound. The information regarding a person is, for example, information, such as the age, the gender, or the like of a person who makes sound. The information regarding an object is, for example, information, such as an object type (a bell at a church, a buzzer, or the like) included in the sound. The analyzing apparatus can obtain these pieces of information, for example, by analyzing the sound data through use of existing sound recognition processing.

For example, when the analyzing apparatus can identify the language of a person who makes sound or the location, occupation, preference, or the like of the person by analyzing the contents of the sound made by the person, ambient sound included in the sound, or the like through use of existing sound recognition processing, the piece of analysis information may include these pieces of information.

For example, as long as the analyzing apparatus can analyze a sound-making object, ambient sound included in voice and/or sound, and so on and can identify the location of the sound-making object, by using existing sound recognition processing, the analysis information may further include information regarding the analyzed sound and/or the location of the object.

When the piece of machine-learning data is text data, the piece of analysis information corresponding to the text data is, for example, information regarding the contents of text included in the text data. The information regarding text may include, for example, a character, a character string, a word, or a sentence included in the text or information (e.g., English, Chinese, German, or Japanese) regarding a language or the like corresponding thereto. The analyzing apparatus can obtain these pieces of information, for example, by analyzing the text data through use of existing character recognition processing.

For example, when the analyzing apparatus can determine the location, age, gender, occupation, preference or the like of a person who creates text, through use of existing character recognition processing, the piece of analysis information may further include these pieces of information.

Since the image recognition processing, the sound recognition processing, and the character recognition processing used by the analyzing apparatus are existing processing, detailed descriptions thereof are not given herein.

In the present embodiment, the analysis data 52 includes, for example, pieces of analysis information corresponding to the respective pieces of machine-learning data. In this case, each piece of analysis information is contained in the analysis data 52 in association with information indicating which of the pieces of machine-learning data was analyzed to obtain the piece of analysis information.

The analysis information may also include, for example, information (location information) regarding the location where each piece of machine-learning data was obtained.

When the piece of machine-learning data is constituted by a combination of image data, sound data, and text data, the piece of analysis information corresponding to the piece of machine-learning data includes information that the analyzing apparatus obtained by performing any of the image recognition processing, the sound recognition processing, and the character recognition processing, as appropriate, in accordance with the combination of the data constituting the piece of machine-learning data.

The storage device 6 can be accessed by the task generation apparatus 4 and stores the worker information DB 61 therein. In the present embodiment, the worker information DB 61 contains worker information including attribute information regarding workers' personal attributes received from equipment used by the workers. When the number of workers is two or more, the worker information including the attribute information regarding the personal attributes of each worker is contained in the worker information DB 61.

In the present embodiment, a description will be given in conjunction with an example of the worker information including the attribute information of the worker 1. Since the worker information including the attribute information of workers other than the worker 1 is the same or similar, a detailed description thereof is not given hereinafter.

The task generation apparatus 4 may obtain access history of the worker 1 from a web server apparatus (not illustrated), which provides predetermined web information, and store the access history in the worker information corresponding to the worker 1 in the worker information DB 61. In this case, when information, such as an ID and a password, used when the worker 1 accesses the predetermined web information is pre-contained in the worker information DB 61, the task generation apparatus 4 can obtain the access history of the worker 1 by accessing the web server apparatus (not illustrated).

For example, when the access history of the worker 1 includes information indicating the location and the time at which the worker 1 accessed the web server apparatus (not illustrated), the task generation apparatus 4 can determine the location of the worker 1 by analyzing the access history through use of an analyzing apparatus (not illustrated).

The task generation apparatus 4 may also obtain upload history of the worker 1 from an SNS server apparatus (not illustrated), which provides a predetermined SNS, and store the upload history in the worker information corresponding to the worker 1 in the worker information DB 61. In this case, when information, such as an ID and a password, used when the worker 1 accesses the predetermined SNS is pre-contained in the worker information DB 61, the task generation apparatus 4 can obtain the upload history of the worker 1 by accessing the SNS server apparatus.

For example, by using the analyzing apparatus (not illustrated), the task generation apparatus 4 may analyze content, uploaded by the worker 1, on the basis of the obtained upload history to determine the preference of the worker 1.

The attribute information of the worker 1 may include, for example, location information indicating the place of the equipment 2 used when the worker 1 accessed the task generation apparatus 4 over the network 3.

In addition, the attribute information of the worker 1 may include information regarding the age of the worker 1. The information regarding the age of the worker 1 may be, for example, information indicating the age of the worker 1 or information indicating an age group (teens, twenties, or the like) corresponding to the age of the worker 1.

The attribute information of the worker 1 may include information regarding the gender of the worker 1. The information regarding the gender is information indicating whether the worker 1 is male or female.

Although an example in which the storage devices 5 and 6 are physically independent from each other has been described above, as illustrated in FIGS. 4 and 5, the present disclosure is not limited thereto. For example, the storage devices 5 and 6 may be configured as a physically single storage device 7.

In this case, for example, the machine-learning data DB 51, the analysis data 52, and the worker information DB 61 are stored in the storage device 7, as illustrated in FIG. 6.

In short, when the task generation apparatus 4 can access each of the machine-learning data DB 51, the analysis data 52, and the worker information DB 61, the storage device or devices that store the machine-learning data DB 51, the analysis data 52, and the worker information DB 61 therein may take any form. For example, the task generation apparatus 4 may have a configuration including a storage device or devices (not illustrated) that store the machine-learning data DB 51, the analysis data 52, and the worker information DB 61 therein.

[Task Generation Apparatus]

The task generation apparatus 4 is, for example, equipment used by a processing-requesting side. The processing-requesting side corresponds to, for example, an operator or an administrator of the task generation apparatus 4. In order to collect machine-learning big data desired by the processing-requesting side, the task generation apparatus 4 generates a task (a request task) for making a request for performing task processing to workers. In this case, for example, the task generation apparatus 4 may be realized using a server apparatus or may be realized using a portion of an apparatus implementing a cloud server.

In the present embodiment, the task processing is, for example, processing for extracting at least one of pieces of machine-learning data as specific data and giving label information for machine learning to each of the extracted at least one of the pieces of machine-learning data.

In the present embodiment, the request task is, for example, a task transmitted to the equipment used by the worker 1 among a plurality of workers registered in the worker information DB 61.

One example of a detailed configuration of the task generation apparatus 4 will be described below with reference to FIG. 7.

Figure 7:
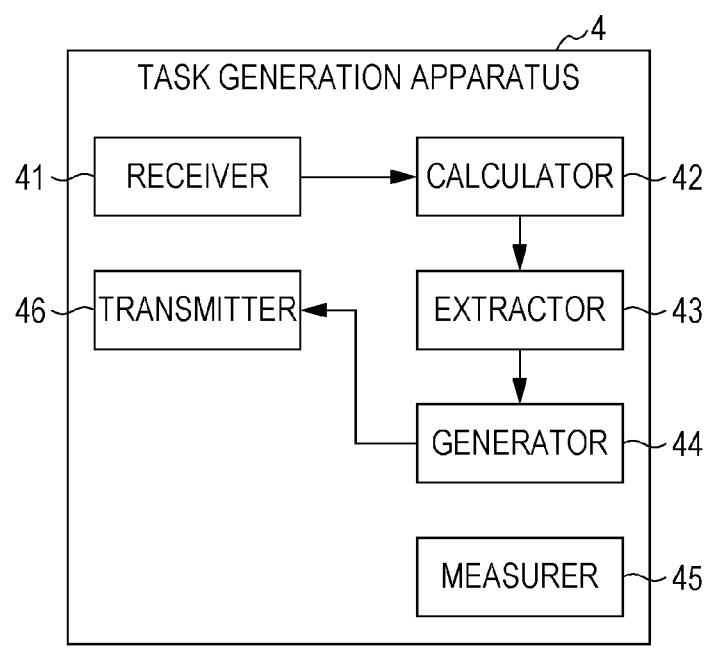
FIG. 7 is a diagram illustrating one example of a detailed configuration of a task generation apparatus in the embodiment.

FIG. 7 is a diagram illustrating one example of a detailed configuration of the task generation apparatus in the present embodiment.

As illustrated in FIG. 7, the task generation apparatus 4 includes a receiver 41, a calculator 42, an extractor 43, a generator 44, a measurer 45, and a transmitter 46.

The following description will be given in conjunction with an example of a case in which the task generation apparatus 4 generates a request task for requesting the worker 1 among a plurality of workers to perform task processing.

The task generation apparatus 4 has a hardware configuration including, for example, a processor (not illustrated) and a memory (not illustrated). The memory is, for example, a recording medium, such as a semiconductor memory or a hard disk. For example, programs corresponding to functions to be realized in the task generation apparatus 4 are recorded in the memory. Examples of the programs include programs for implementing the respective functions of the calculator 42, the extractor 43, the generator 44, and the measurer 45.

In the task generation apparatus 4, for example, the processor executes the programs to thereby cause the calculator 42, the extractor 43, the generator 44, and the measurer 45 to function.

Alternatively, the task generation apparatus 4 may have, for example, a configuration including an integrated circuit for implementing the respective functions of the calculator 42, the extractor 43, the generator 44, and the measurer 45.

Alternatively, the task generation apparatus 4 may have, for example, a configuration that includes a processor (not illustrated) and a memory (not illustrated) and in which a program for causing at least one of the calculator 42, the extractor 43, the generator 44, and the measurer 45 to function is stored in the memory, and the other constituent element(s) is (are) implemented using an integrated circuit.

For example, when each of a plurality of workers accesses the task generation apparatus 4 over the network 3 for the first time by using his or her equipment, a piece of worker information including attribute information regarding his or her personal attributes is transmitted from the equipment used by him or her to the task generation apparatus 4.

Thus, the receiver 41 receives the worker information from the equipment used by each worker. The received worker information of each worker is contained in the worker information DB 61. After transmitting the worker information, when each worker accesses the task generation apparatus 4 again by using his or her equipment, any worker information that should be transmitted is transmitted, as appropriate. The worker information that should be transmitted is, for example, location information indicating the location of the worker or the equipment used when the worker accesses the task generation apparatus 4. The location information in the present embodiment is included in the attribute information of each worker, and the attribute information is included in the worker information of each worker. Hence, the location information is the attribute information of each worker and is also the worker information. Upon receiving information including the location information again from the equipment used by the worker 1, the task generation apparatus 4 updates the location information included in the worker information of the worker 1, specifically, the attribute information of the worker 1, contained in the worker information DB 61 to the received location information.

In the present embodiment, a description will be given of an example in which the receiver 41 receives, from the equipment 2, the worker information including the attribute information regarding the personal attributes of the worker 1. The receiver has a hardware configuration including, for example, a receiving circuit. The task generation apparatus 4 stores the received worker information of the worker 1 in the worker information DB 61.

The calculator 42 calculates degrees of association between the worker information of the worker 1 received by the receiver 41 (or the worker information of the worker 1 which is contained in the worker information DB 61) and each of the pieces of analysis information. The pieces of analysis information correspond to the respective pieces of machine-learning data.

In the present embodiment, with respect to each of the pieces of machine-learning data, the calculator 42 calculates a degree of association between the worker information of the worker 1 received by the receiver 41 and the piece of analysis information corresponding to the piece of machine-learning data.

In this case, for example, it is assumed that the attribute information of the worker 1 includes the location information of the worker 1 when the worker 1 accessed the task generation apparatus 4 by using the equipment 2.

In this case, for example, when the equipment 2 used by the worker 1 accesses the task generation apparatus 4, the location information of the worker 1 may be input and the attribute information of the worker 1 which includes the input location information may be transmitted to the task generation apparatus 4.

Alternatively, for example, when the equipment 2 is portable equipment having a global positioning system (GPS) function (not illustrated), the equipment 2 may detect the location of the equipment 2 during access to the task generation apparatus 4, store the detected location in the attribute information as the location information of the worker 1, and transmit the resulting attribute information to the task generation apparatus 4. For example, when the worker 1 carries the equipment 2 with him or her, the location of the worker 1 can be determined based on the location of the equipment 2.

It is also assumed that the piece of analysis information includes location information indicating the location where the corresponding piece of machine-learning data was obtained.

In this case, the calculator 42 calculates a degree of association, based on a distance calculated using the location information of the equipment 2 used by the worker 1 or the location information included in the personal attributes of the worker 1 and on the location information included in the piece of analysis information corresponding to the piece of machine-learning data.

The calculator 42 calculates, for example, a higher degree of association, as the calculated distance decreases.

The location information included in the personal attributes of the worker 1 includes, for example, a postal code, country, prefecture (or state), city, town, and village indicating the place where the worker 1 lives, and the location information corresponding to the piece of machine-learning data includes, for example, a postal code, country, prefecture (or state), city, town, and village indicating the place where the piece of machine-learning data is obtained. When the postal code, country, prefecture (or state), city, town, and village are specified, a certain range is identified.

A range identified with a village is smaller than a range identified with a town. A range identified with a town is smaller than a range identified with a city. A range identified with a city is smaller than a range identified with a prefecture (or state), and a range identified with a prefecture (or state) is smaller than a range identified with a country.

When the postal code can specify, for example, a country, prefecture (or state), and city, the range of a town located in the city that can be identified is smaller than a range identified with the postal code.

When the place indicated by the location information included in the attribute information of the worker 1 and the place indicated by the location information corresponding to the piece of machine-learning data match each other, the calculator 42 determines that the distance between the two places is closer and calculates a higher degree of association, as a range identified with the places that match each other becomes smaller.

The calculator 42 calculates a higher degree of association, for example, in order of the places "country", "prefecture (or state)", "city", "town", and "village" that match each other.

Also, when one of the location information included in the attribute information of the worker 1 and the location information corresponding to the piece of machine-learning data indicates an address and the other location information indicates a place, the calculator 42 checks, for example, whether or not any of the postal code, country, prefecture (or state), city, town, and village indicated by the address matches any of the postal code, country, prefecture (or state), city, town, and village indicated by the other location information. When they match each other, the calculator 42 may calculate a degree of association, based on the places that match each other.

Also, when one of the location information included in the attribute information of the worker 1 and the location information corresponding to the piece of machine-learning data indicates longitude and latitude and the other location information indicates a place or address, the calculator 42 determines, for example, information about the place or address corresponding to the longitude and latitude indicated by the location information corresponding to the piece of machine-learning data, based on the information of the longitude and latitude. For example, the calculator 42 may transmit the information of the longitude and latitude to a server apparatus (not illustrated), which provides map information, via the transmitter 46 and over the network 3 and may receive information about a place or address, transmitted from the server apparatus as response information, from the server apparatus via the receiver 41.

The calculator 42 may compare the determined place or address with the place or address indicated by the other location information.

When both the location information included in the attribute information of the worker 1 and the location information corresponding to the piece of machine-learning data indicate longitude and latitude, the calculator 42 may calculate a distance on the basis of the pieces of location information and calculate a degree of association on the basis of the calculated distance.

It is assumed that, for example, the attribute information of the worker 1 includes information regarding the age of the worker 1. It is also assumed that, for example, the analysis information includes age information of a person included in the corresponding piece of machine-learning data.

In this case, the calculator 42 calculates a degree of association on the basis of the information regarding the age included in the attribute information of the worker 1 and the age information of the person included in the corresponding piece of analysis information.

The calculator 42 calculates, for example, a higher degree of association for a smaller difference between the age of the worker 1 included in the attribute information of the worker 1 and the age indicated by the age information included in the corresponding piece of analysis information.

It is assumed that, for example, the attribute information of the worker 1 includes information regarding the gender of the worker 1. It is also assumed that, for example, the piece of analysis information includes gender information of a person included in the corresponding machine-learning data.

In this case, the calculator 42 calculates a degree of association, for example, on the basis of the information regarding the gender of the worker 1 included in the attribute information of the worker 1 and the gender information of the person included in the piece of analysis information.

The calculator 42 calculates a higher degree of association for a case in which the gender of the worker 1 and the gender of the person included in the piece of analysis information match each other than the degree of association for a case in which they do not match each other. When the genders of a plurality of people are included in the piece of analysis information, the calculator 42 may calculate a higher degree of association as the number of people who are included in the piece of analysis information and whose gender matches the gender of the worker 1 increases. That is, when a plurality of people are included in the piece of machine-learning data corresponding to the piece of analysis information, the degree of association is set to be higher for the machine-learning data including a larger number of people whose gender is the same as the gender of the worker 1 of the plurality of people.

Also, for example, it is assumed that the attribute information of the worker 1 includes information about the occupation of the worker 1. For example, it is assumed that the piece of analysis information includes information (occupation information) indicating the occupation of a person included in the corresponding machine-learning data.

In this case, the calculator 42 calculates a degree of association, for example, on the basis of the information regarding the occupation of the worker 1 included in the attribute information of the worker 1 and the occupation of the person included in the piece of analysis information.

The calculator 42 calculates a higher degree of association for a case in which the gender of the worker 1 and the occupation of the person included in the piece of analysis information match each other than the degree of association for a case in which they do not match each other.

When the received worker information of the worker 1 (or the worker information of the worker 1 which is contained in the worker information DB 61) includes only one of the location information of the worker 1, the information regarding the age of the worker 1, the information regarding the gender of the worker 1, and the information regarding the occupation of the worker 1 as the attribute information of the worker 1, the calculator 42 may calculate degrees of association between with each of the pieces of analysis information including the same information as the included information.

When the received worker information of the worker 1 includes two or more of the information regarding the age of the worker 1, the information regarding the gender of the worker 1, and the information regarding the occupation of the worker 1 as the attribute information of the worker 1, the calculator 42 may calculate degrees of association with each of the pieces of analysis information including any of the two or more of the information.

On the basis of the degree of association calculated by the calculator 42, the extractor 43 extracts, specific data, at least one of the pieces of machine-learning data. For example, the extractor 43 extracts, as the specific data, one of the pieces of machine-learning data corresponding to the piece of analysis information with which the degree of association calculated by the calculator 42 is higher than a predetermined threshold. When there are a plurality of pieces of analysis information with which the calculated degrees of association are higher than the predetermined threshold, the extractor 43 may extract pieces of machine-learning data corresponding to the respective pieces of analysis information as the specific data or may extract the machine-learning data corresponding to any of the pieces of analysis information as the specific data.

The calculator 42 calculates a degree of association with the piece of analysis information including the same information as, of the attribute information included in the worker information of the worker 1, any of the location information of the worker 1, the information regarding the age of the worker 1, the information regarding the gender of the worker 1, and the information regarding the occupation of the worker 1.

The threshold used by the extractor 43 may be set to be different for each of the location information of the worker 1, the information regarding the age of the worker 1, the information regarding the gender of the worker 1, and the information regarding the occupation of the worker 1 or may be set to be different for each piece of analysis information.

Also, for example, the extractor 43 may further extract, as specific data, a piece of machine-learning data for which the number of times a request for performing task processing for giving label information with respect to machine-learning data corresponding to the specific data was made in the past is smaller than a pre-defined threshold.

The specific data extracted by the extractor 43 is subjected to the task processing the worker 1 is requested to perform. The task processing the worker 1 is requested to perform is processing for giving label information to the specific data.

As described above, the extractor 43 can extract, from the pieces of machine-learning data, the specific data that suits the worker information of the worker 1.

The generator 44 generates a request task, which is a task for requesting the worker 1 to perform task processing for giving label information to the specific data extracted by the extractor 43.

The generator 44 in this case is not limited to a generator that generates a request task including only the specific data. The generator 44 may generate a request task including the piece of machine-learning data corresponding to the specific data, a plurality of pieces of label candidate information prepared based on the piece of analysis information corresponding to the specific data, and selection information for making the worker 1 select one of the pieces of label candidate information and give the selected piece of label candidate information as the label information to the piece of machine-learning data.

The measurer 45 measures the number of times each of the pieces of machine-learning data was used to generate request tasks (this number of times may herein be referred to as the "number of usages"). In the present embodiment, the measurer 45 increments the number of usages for the specific data extracted by the extractor 43. The number of usages may be held in the measurer 45 or may be held in the machine-learning data DB 51.

The transmitter 46 transmits the request task generated by the generator 44 to the equipment 2, used by the worker 1, over the network 3. The transmitter 46 has a hardware configuration including, for example, a transmitting circuit.

[Operation of Task Generation Apparatus]

Next, a description will be given of the operation of the task generation apparatus 4 configured as described above.

Figure 8:
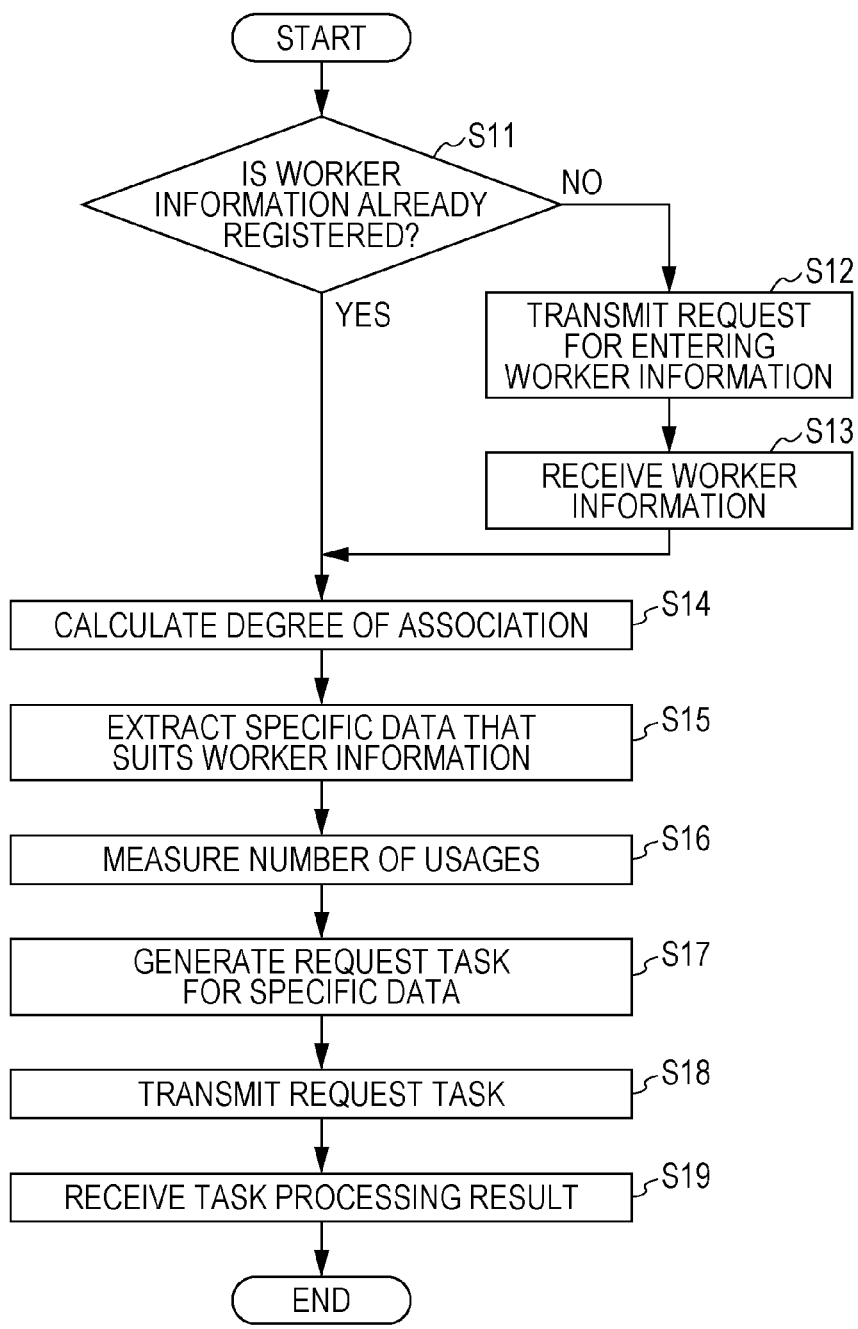
FIG. 8 is a flowchart illustrating one example of the operation of the task generation apparatus in the embodiment.

FIG. 8 is a flowchart illustrating one example of the operation of the task generation apparatus in the present embodiment.

It is assumed that, by using the equipment 2, the worker 1 has issued, to the task generation apparatus 4 over the network 3, a notification indicating that he or she can perform work for task processing and a notification indicating a time slot in which he or she can perform work for the task processing.

The task generation apparatus 4 identifies the worker 1 who has issued the notification indicating that he or she can perform work for the task processing. In this case, the task generation apparatus 4 that has received the notification from the equipment 2 first checks whether or not the worker information of the worker 1 who has issued the notification is already registered in the worker information DB 61 (S11). In the present embodiment, the task generation apparatus 4 checks whether or not the worker information of the worker 1 is stored in the storage device 6.

In S11, if the worker information is not registered (NO in S11), the task generation apparatus 4 transmits a request for entering the worker information (S12). When the task generation apparatus 4 receives the worker information of the worker 1 from the equipment 2 (S13), the process proceeds to S14. In the present embodiment, when the worker information of the worker 1 is not stored in the storage device 6, the task generation apparatus 4 issues, to the equipment 2, a notification for a request for transmitting the worker information about the worker 1. Subsequently, upon receiving the worker information of the worker 1 from the equipment 2, the task generation apparatus 4 stores the received worker information of the worker 1 in the storage device 6 (or registers the received worker information of the worker 1 in the worker information DB 61), and the process proceeds to S14.

On the other hand, if it is determined in S11 that the worker information of the worker 1 is already registered in the worker information DB 61 (YES in S11), the task generation apparatus 4 calculates degrees of association between the worker information of the worker 1 and each of pieces of machine-learning data (S14). In the present embodiment, if the worker information of the worker 1 is stored in the storage device 6, the task generation apparatus 4 calculates degrees of association between the worker information of the worker 1 and each of the pieces of analysis information. The pieces of analysis information correspond to each of pieces of machine-learning data.

Next, the task generation apparatus 4 extracts specific data that suits the worker information (S15). For example, the task generation apparatus 4 may extract, as the specific data, a piece of machine-learning data corresponding to a piece of analysis information whose the degree of association with the worker information of the worker 1 is higher than a predetermined threshold.

Also, for example, with respect to each of the pieces of machine-learning data, the task generation apparatus 4 may check the number of times the piece of machine-learning data was used in the past to generate request tasks. The task generation apparatus 4 may extract, as the specific data, a piece of machine-learning data whose number of usages is smaller than a predetermined threshold and whose degree of association between the corresponding piece of analysis information and the worker information of the worker 1 is higher than a predetermined threshold.

In the present embodiment, a description will be given of an example in which the task generation apparatus 4 uses the latter processing to extract one of the pieces of machine-learning data as the specific data.

With respect to the specific data extracted in S15, a request for performing task processing for giving label information will be made to the worker 1.

After S15, the task generation apparatus 4 measures the number of usages of the specific data (S16). In the present embodiment, the task generation apparatus 4 increments the number of usages of the extracted specific data by "1".

Next, the task generation apparatus 4 generates a request task for the specific data (S17). In the present embodiment, the task generation apparatus 4 generates a request task that is a task for requesting the worker 1 to perform task processing for giving label information to the extracted specific data. The request task in this case includes the piece of machine-learning data corresponding to the specific data, a plurality of pieces of label candidate information prepared based on the piece of analysis information resulting from analysis of the piece of machine-learning data, and selection information for making the worker 1 select one of the pieces of label candidate information and to give the selected piece of label candidate information as the label information to the piece of machine-learning data. The request task may include only the specific data or may include the specific data and a plurality of pieces of label candidate information.

After S17, the task generation apparatus 4 transmits the generated request task (S18). In the present embodiment, the task generation apparatus 4 transmits the generated request task to the equipment 2 used by the worker 1.

Lastly, the task generation apparatus 4 receives a task processing result for the request task (S19). In the present embodiment, the task generation apparatus 4 receives, from the equipment 2, a task processing result for the request task performed by the worker 1.

If the number of usages of the specific data used to generate request tasks in the past is not considered in the extraction of the one of the pieces of the machine-learning data as specific data, the process in S16 is not essential.

As described above, on the basis of each of the pieces of analysis information and the worker information, the task generation apparatus 4 can generate a request task for the worker 1, the request task including the specific data extracted from the pieces of machine-learning data.

Although the above description has been given of a configuration in which the task generation apparatus 4 transmits the request task for the worker 1 registered in the worker information DB 61 to the equipment 2 used by the worker 1, the present disclosure is not limited thereto.

For example, in a case in which a notification indicating that a worker 2 (not illustrated) other than the worker 1 can perform work or a notification indicating a time slot in which the worker 2 can perform work is received from equipment used by the worker 2, when the task generation apparatus 4 performs the above-described processing by using the worker information of the worker 2, it can extract specific data that suites the worker 2 and can generate a corresponding request task. Thus, the generated request tasks can be transmitted to the respective pieces of equipment of the workers 1 and 2.

[Work of Workers]

Next, a description will be given of work (task processing) of the worker 1 who uses the equipment 2.

Figure 9:
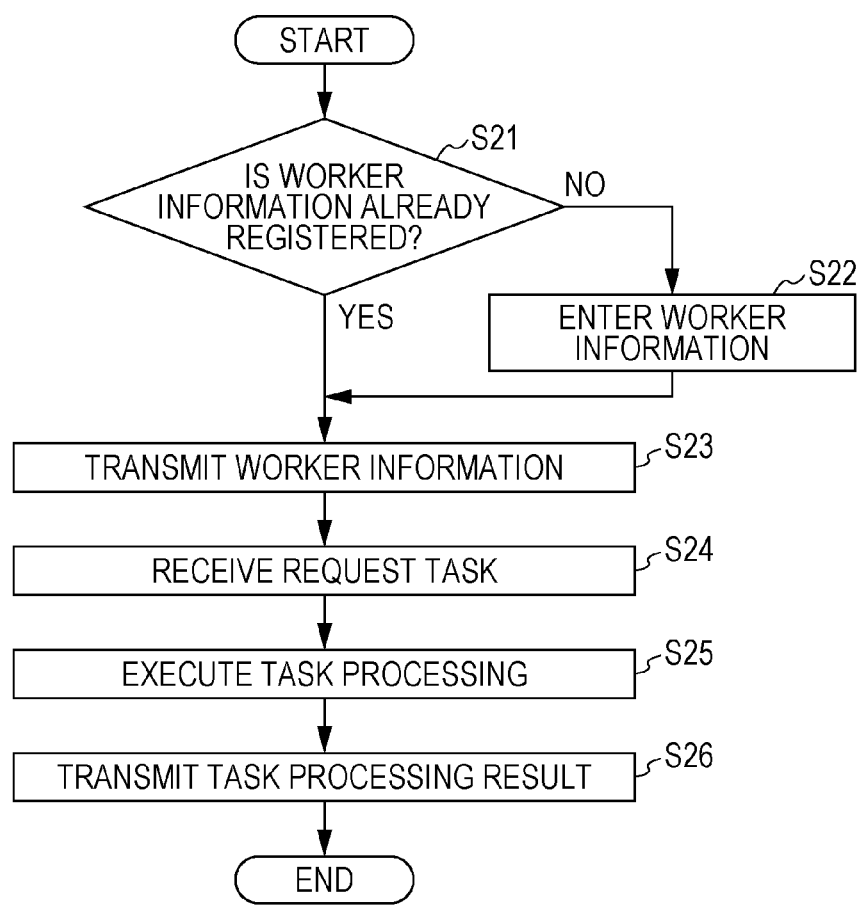
FIG. 9 is a flowchart illustrating one example of task processing performed by a worker in the embodiment.

FIG. 9 is a flowchart illustrating one example of the task processing performed by a worker in the present embodiment. FIG. 10 illustrates one example of an input screen of the worker information of a worker in the present embodiment. FIGS. 11, 12, and 13 are examples of a selection screen with which a worker performs task processing in the present embodiment.

It is assumed that, by using the equipment 2, the worker 1 has issued a notification indicating that he or she can perform task processing to the task generation apparatus 4 over the network 3.

In this case, first, the equipment 2 checks whether or not the worker information of the worker 1 is already registered (S21). If the worker information of the worker 1 is not registered (NO in S21), the equipment 2 presents, for example, a display screen like that illustrated in FIG. 10 and prompts the worker 1 to enter his or her worker information, such as an address (S22). Thereafter, the process proceeds to S23. In the example illustrated in FIG. 10, for instance, the postal code and address of the worker 1 are output onto the display screen of the display equipment of the equipment 2. For example, by using the input unit 23, the worker 1 enters his or her postal code and address in input boxes located to the right of "Postal code" and "Address" and gives an instruction for transmitting the entered postal code and address to the task generation apparatus 4, so that the entered postal code and address are transmitted to the task generation apparatus 4 in association with information for identifying the worker 1.

The information for identifying the worker 1 may be, for example, information, such as the name or an ID, of the worker 1. For example, the information for identifying the worker 1 may be pre-stored in the equipment 2 used by the worker 1 or may be entered using the input unit 23.

The example illustrated in FIG. 10 is merely exemplary and illustrative. For example, the input screen may be configured so that at least one of the nationality, occupation, age, and gender of the worker 1 is further entered.

Alternatively, the input screen may be configured to enter information that the task generation apparatus 4 uses to access at least one of the access history of the worker 1 about access to a predetermined website and the upload history of the worker 1 about uploading data to a predetermined SNS. The access history and the upload history may include, for example, the attribute information regarding the personal attributes of the worker 1, and the task generation apparatus 4 may access the access history or the upload history to obtain the attribute information regarding the personal attributes of the worker 1 and store the obtained attribute information regarding the personal attributes of the worker 1 in the storage device 6 as the worker information of the worker 1.

On the other hand, if it is determined in S21 that the worker information of the worker 1 is already registered (YES in S21), the equipment 2 transmits the worker information to the task generation apparatus 4 (S23). If the worker information of the worker 1 is already held in the task generation apparatus 4, the equipment 2 may transmit a worker name that allows the worker 1 to be identified, a password for accessing the worker information of the worker 1, and so on without transmitting the worker information of the worker 1.

After S23, the equipment 2 receives a request task (S24). In the present embodiment, the equipment 2 receives, from the task generation apparatus 4, a request task generated for the worker 1.

Next, the equipment 2 makes the worker 1 execute the task processing (S25).

In this case, for example, as illustrated in FIG. 11, the equipment 2 may display "image Ta", "image Tb", and "image Tc" including specific data and make the worker 1 select the image to which he or she thinks prepared label information "X" is to be given. Thus, by selecting the appropriate image from the presented options, the worker 1 can execute processing (task processing) for giving the label information to the specific data.

For example, as illustrated in FIG. 12, the equipment 2 may present an image of a road sign as a piece of specific data, present "traffic signal ahead", "watch for pedestrians", and "priority road" as pieces of label candidate information (also referred to as options), and make the worker 1 select one of the options. For example, as illustrated in FIG. 13, the equipment 2 may present an image of a road sign as a piece of specific data, present "no traffic allowed in both directions", "stop before proceeding", and "slow down" as options, and make the worker 1 select one of the options. Thus, by selecting the appropriate option from the presented options, the worker 1 can execute processing for giving the label information to the specific data.

Lastly, when the task processing is finished, the equipment 2 transmits a task processing result (S26). The task processing result is, for example, information indicating which of the presented options the worker 1 selected. In the example illustrated in FIG. 13, the task processing result is information indicating which of the presented "no traffic allowed in both directions", "stop before proceeding", and "slow down" the worker 1 selected.

The task generation apparatus 4 stores the task processing result, received by the receiver 41, in the machine-learning data DB 51 in association with the piece of machine-learning data corresponding to the specific data included in the request task transmitted to the equipment 2.

The task generation apparatus 4 may manage, as label information for the piece of machine-learning data, the task processing result associated with the piece of machine-learning data.

When a request for performing task processing for giving label information to the same specific data is made to workers, and consequently there are a plurality of task processing results associated with a piece of machine-learning data, the task generation apparatus 4 may manage any of the task processing results as label information for the piece of machine-learning data or may manage, as label information for the piece of machine-learning data, task processing results that have the same contents and whose number is larger.

Advantages, Etc. of Embodiment

As described above, according to the present embodiment, in a system in which a request for performing task processing is made to workers, it is possible to realize a task generation method and a task generation apparatus that can suppress variations in the amount of time taken for task processing performed by respective workers and variations in the qualities of task processing results obtained from the respective workers.

For example, a piece of machine learning data, as the specific data, illustrated in FIG. 12 is image data including a road sign in Germany. Accordingly, for example, it is assumed that the worker information of the worker 1 indicates that the worker 1 is a German or indicates that the address of the worker 1 is located in Germany, and a piece of analysis information corresponding to the image data (machine-learning data) including the German road sign illustrated in FIG. 12 includes, as an object type, information indicating a road sign and includes, as location information of the road sign, information indicating the place where the road sign is posted. When the task processing for giving label information to the image data including the German road sign is processing for selecting the meaning of the road sign illustrated in FIG. 12, naturally, anyone who can understand the meaning of the road sign illustrated in FIG. 12 is highly likely to be able to give the correct label information in a short period of time.

The calculator 42 in the task generation apparatus 4 calculates a degree of association, for example, on the basis of a distance calculated using the location information of a worker and the location information included in the piece of analysis information. When a road sign in question is a road sign that can be understood by anyone who lives in Germany, the country where a worker lives is compared with the country (Germany in this example) where the road sign is defined, and a value smaller than the degree of association calculated by the calculator 42 when the countries are the same may be pre-set as a threshold used by the extractor 43.

In this case, the threshold used by the extractor 43 is set to be a value larger than the degree of association calculated by the calculator 42 when the country where a worker lives and the country (Germany in this example) where the road sign is defined differ from each other.

With such setting, a request for performing task processing for giving label information to image data (machine-learning data) including the road sign can be made to a worker having his or her address in the country where the road sign is defined.

Also, when a road sign in question is, for example, a road sign that is often seen in particular regions (e.g., towns in mountain areas) and is rarely seen in other regions, any worker who is in such a region is highly likely to have knowledge about the road sign.

The threshold used for the processing performed by the extractor 43 may be set to be a value smaller than the degree of association calculated by the calculator 42, when the country, prefecture (or state), city, and town indicated by the location information included in the attribute information of the worker and the country, prefecture (or state), city, and town indicated by the location information corresponding to the piece of machine-learning data match each other.

The threshold used for the processing performed by the extractor 43 may be set to a value larger than the degree of association calculated by the calculator 42, when the country, prefecture (or state), and city indicated by the location information included in the attribute information of the worker and the country, prefecture (or state), and city indicated by the location information corresponding to the piece of machine-learning data match each other and the towns indicated thereby differ from each other.

That is, when the threshold used by the processing performed by the extractor 43 is pre-set to a value at which a worker who seems to have knowledge about the German road sign illustrated in FIG. 12 can be extracted, the extractor 43 extracts the one piece of machine-learning data corresponding to the road sign.

When the extractor 43 extracts the image data (machine-learning data) of the above-described German road sign as specific data, the generator 44 in the task generation apparatus 4 generates a request task for the specific data and transmits the generated request task to the equipment 2 of the worker 1. This makes it possible to make a request for performing task processing to the worker 1 who has knowledge about the specific data and who is likely to be able to give the correct label information in a short period of time.

For example, a piece of machine learning data, as the specific data, illustrated in FIG. 13 is an Icelandic road sign. For example, it is assumed that the worker information of the worker 1 indicates that the worker 1 is an Icelandic or the address of the worker 1 is located in Iceland, and a piece of analysis information corresponding to the image data (machine-learning data) including the Icelandic road sign illustrated in FIG. 13 includes, as an object type, information indicating a road sign and information indicating the place where the road sign is posted.

In this case, the task generation apparatus 4 performs processing that is similar to the processing described above with reference to FIG. 12.

When the threshold used by the processing performed by the extractor 43 is pre-set to a value at which a worker who seems to have knowledge about the Icelandic road sign illustrated in FIG. 13 can be extracted, the extractor 43 extracts the piece of machine-learning data corresponding to the road sign.

When the extractor 43 extracts the image data (machine-learning data) of the above-described Icelandic road sign as specific data, the generator 44 in the task generation apparatus 4 generates a request task for the specific data and transmits the generated request task to the equipment 2 of the worker 1. With this arrangement, the task generation apparatus 4 can extract the piece of machine-learning data to which the worker 1 is highly likely to be able to give the label information in a short period of time from the machine-learning data DB 51 as specific data and can request the worker 1 to perform task processing for giving the label information to the specific data.

It is also assumed that information regarding the age of a person included in a piece of machine-learning data is included in a piece of analysis information corresponding to the piece of machine-learning data. In addition, it is assumed that the worker information of the worker 1 (attribute information) includes information indicating the age of the worker 1. When the age that is appropriate for the task processing for giving label information to the piece of machine-learning data is close to the age of the person included in the piece of machine-learning data, the possibility of being able to give the correct label information in a short period of time is high.

For example, the calculator 42 in the task generation apparatus 4 calculates the absolute value of the difference between the age of the worker 1 and the age of the person included in the piece of analysis information and calculates a higher degree of association as the absolute value of the calculated difference becomes smaller. Hence, an age that can be allowed for the age of the person included in the piece of analysis information is predetermined, and based on the maximum value of the absolute value of the difference between these ages, the value of the degree of association calculated by the calculator 42 may be pre-set as the threshold used by the extractor 43.

Thus, when the absolute value of the difference between the age of the worker 1 and the age of the person included in the piece of analysis information is smaller than the above-described maximum value, the degree of association become larger than the threshold, and the extractor 43 extracts the piece of machine-learning data as specific data.

With this arrangement, the task generation apparatus 4 can extract the piece of machine-learning data to which the worker 1 is highly likely to be able to give the correct label information in a short period of time from the machine-learning data DB 51 as specific data and can request the worker 1 to perform task processing for giving the label information to the specific data.

It is also assumed that the information regarding the gender of the person included in a piece of machine-learning data is included in a piece of analysis information corresponding to the piece of machine-learning data. In addition, it is assumed that the information indicating the gender of the worker 1 is included in the worker information of the worker 1 (attribute information). When a gender that is appropriate for the task processing for giving the label information to the piece of machine-learning data is the same as the gender of the person included in the piece of machine-learning data, it is assumed that the possibility of being able to give the correct label information in a short period of time is high.

For example, the calculator 42 in the task generation apparatus 4 compares the gender of the worker 1 with the gender of the person included in the piece of analysis information, and calculates a degree of association on the basis of the result of the comparison. For example, the degree of association calculated when the genders are the same is higher than the degree of association calculated otherwise. Hence, the threshold used by the extractor 43 may be pre-set to, for example, a smaller value than the degree of association calculated by the calculator 42 when the gender of the worker 1 and the gender of the person included in the piece of analysis information are the same. In this case, in addition, the threshold used by the extractor 43 is set to, for example, a value larger than the degree of association calculated by the calculator 42 when the gender of the worker 1 and the gender of the person included in the piece of analysis information differ from each other.

With this setting, the degree of association with the piece of analysis information including the information indicating the same gender as the gender included in the worker information of the worker 1 becomes larger than the threshold, and the extractor 43 extracts the piece of machine-learning data corresponding to the piece of analysis information as specific data.

With this arrangement, the task generation apparatus 4 can extract the piece of machine-learning data with which the worker 1 is highly likely to be able to give the correct label information in a short period of time from the machine-learning data DB 51 as specific data and can request the worker 1 to perform task processing for giving the label information to the specific data.

Also, it is assumed that the information regarding the occupation of the person included in a piece of machine-learning data is included in a piece of analysis information corresponding to the machine-learning data. In addition, it is assumed that the information indicating the occupation of the worker 1 is included in the worker information (attribute information) of the worker 1. When the occupation of the task processing for giving the label information to the piece of machine-learning data is the same as the occupation of the person included in the piece of machine-learning data, it is assumed that the possibility of being able to give the correct label information in a short period of time is high.

For example, the calculator 42 in the task generation apparatus 4 compares the occupation of the worker 1 with the occupation of the person included in the piece of analysis information, and calculates a degree of association on the basis of the result of the comparison. For example, the degree of association when the occupations are the same is calculated to be higher than the degree of association calculated otherwise. Hence, the threshold used by the extractor 43 may be set to, for example, a value smaller than the degree of association calculated by the calculator 42 when the occupation of the worker 1 and the occupation of the person included in the piece of analysis information are the same. In this case, in addition, the threshold used by the extractor 43 is set to, for example, a value larger than the degree of association calculated by the calculator 42 when the occupation of the worker 1 and the occupation of the person included in the piece of analysis information differ from each other.

With this setting, the degree of association with the piece of analysis information including the information indicating the same occupation as the occupation included in the worker information of the worker 1 becomes larger than the threshold, and the extractor 43 extracts the piece of machine-learning data corresponding to the piece of analysis information as specific data.

With this arrangement, the task generation apparatus 4 can extract the piece of machine-learning data to which the worker 1 is highly likely to be able to give the correct label information in a short period of time from the machine-learning data DB 51 as specific data and can request the worker 1 to perform task processing for giving the label information to the specific data.

The above description has been given of details of extracting, as specific data, the piece of machine-learning data corresponding to the piece of analysis information having a high degree of association with any of the pieces of information of the location, age, gender, and occupation of the worker included in the worker information of the worker.

In this case, although a configuration in which the worker enters his or her worker information via the input unit of the equipment used by him or her has been mainly described above, the present disclosure is not limited thereto.

For example, the task generation apparatus 4 may obtain access history of the worker 1 from a web server apparatus (not illustrated), which provides a predetermined web information, analyze the access history by using an analyzing apparatus (not illustrated), and estimate from where the worker 1 accessed the web information. The task generation apparatus 4 may store the estimated information in the worker information (attribute information) of the worker 1 as the location information of the worker 1.

Alternatively, for example, the task generation apparatus 4 may obtain upload history of the worker 1 from a predetermined social networking service (SNS) server apparatus (not illustrated), which provides a predetermined SNS, analyze the upload history by using an analyzing apparatus (not illustrated), and estimate the age, gender, occupation, preference, and so on of the worker 1. The task generation apparatus 4 may also store the information of estimated age, gender, occupation, preference, and so on of the worker 1 in the worker information (attribute information) of the worker 1.

When the extractor 43 extracts a plurality of pieces of specific data, any of the pieces of specific data may be selected using the information regarding the preference of the worker 1.

As described above, the task generation method in the present embodiment offers an advantage in that variations in the amount of time taken for task processing performed by respective workers and variations in the qualities of task processing results obtained from respective workers can be suppressed in a system in which a request for performing task processing is made to workers.

In addition, since the task generation method in the present embodiment allows a plurality of workers to perform accurate task processing in a relatively short period of time, there are also advantages in that the amounts of time in which each of the workers uses the equipment can be reduced, and the amount of electric power and the amount of communication of the equipment 2 can be reduced.

Although the task generation method and the task generation apparatus according to one or more aspects of the present disclosure have been described above in conjunction with the particular embodiment, the present disclosure is not limited to the embodiment. Modes obtained by applying various modifications conceived by those skilled in the art to the embodiment or modes constituted by combining the constituent elements in a different embodiment may also be encompassed by the scope of one or more modes, as long as such modes do not depart from the spirit and scope of the present disclosure. For example, the present disclosure also encompasses the following cases.

(1) Although the task generation apparatus in the embodiment has been described as having the receiver, the calculator, the extractor, the generator, the measurer, and the transmitter, the present disclosure is not limited thereto. The task generation apparatus in the present disclosure may include, for example, the receiver, the calculator, the extractor, and the generator as a minimum configuration.

(2) The task generation method in the present disclosure may be implemented by a cloud service of a service business operator or the like connected to the equipment 2 over a network.

(3) Each apparatus described above is, specifically, a computer system including a microprocessor, a read-only memory (ROM), a random-access memory (RAM), a hard disk unit, a display unit, a keyboard, a mouse, and so on. The RAM or the hard disk unit stores a computer program therein. The microprocessor operates in accordance with the computer program, so that each apparatus realizes its functions. In order realize predetermined functions, the computer program is constituted by a combination of command codes representing instructions for the computer.

(4) Some or all of the constituent elements included in each apparatus described above may be implemented by a single system large scale integration (LSI) circuit. The system LSI is a super-multifunctional LSI manufactured by integrating a plurality of constituent elements on one chip and is, specifically, a computer system including a microprocessor, a ROM, a RAM, and so on. The computer program is stored in the RAM. The microprocessor operates in accordance with the computer program, so that the system LSI realizes its functions.

(5) Some or all of the constituent elements included in each apparatus described above may be implemented by an integrated circuit (IC) card or a single module that can be inserted into and removed from the apparatus. The IC card or the module may be a computer system including a microprocessor, a ROM, a RAM, and so on. The IC card or the module may include the aforementioned super-multifunctional LSI. The microprocessor operates in accordance with the computer program, so that the IC card or the module realizes its functions. The IC card or the module may be tamper-proof.

(6) The present disclosure may also be implemented by the methods described above. Those methods may also be realized by a computer program implemented by a computer or may be realized using digital signals provided by the computer program.

(7) In the present disclosure, the computer program or the digital signals may be recorded to computer-readable recording media, for example, a flexible disk, a hard disk, a CD-ROM, a magneto-optical (MO) disk, a digital versatile disk (DVD), a DVD-ROM, a DVD-RAM, a Blu-ray® Disc (BD), and a semiconductor memory. Those methods may also be realized by the digital signals recorded on/in the recording media.

(8) Additionally, in the present disclosure, the computer program or the digital signals may be transmitted over a telecommunication channel, a wireless or wired communication channel, a network typified by the Internet, data broadcasting, or the like.

(9) Moreover, the present disclosure may be realized by a computer system including a microprocessor and a memory, the memory may store the computer program, and the microprocessor may operate in accordance with the computer program.

(10) The present disclosure may also be implemented by another independent computer system by transporting the recording medium on/in which the program or the digital signals are recorded or transferring the program or the digital signals over the network or the like.

(11) The above-described embodiment and the modifications may also be combined together.

(12) The technique described in the above aspects can be realized, for example, by the following types of cloud service. However, the types of service for which the technique described in the above aspects is realized are not limited to the types described below.

(Service Type 1: Inhouse Data Center Type)

Figure 14:
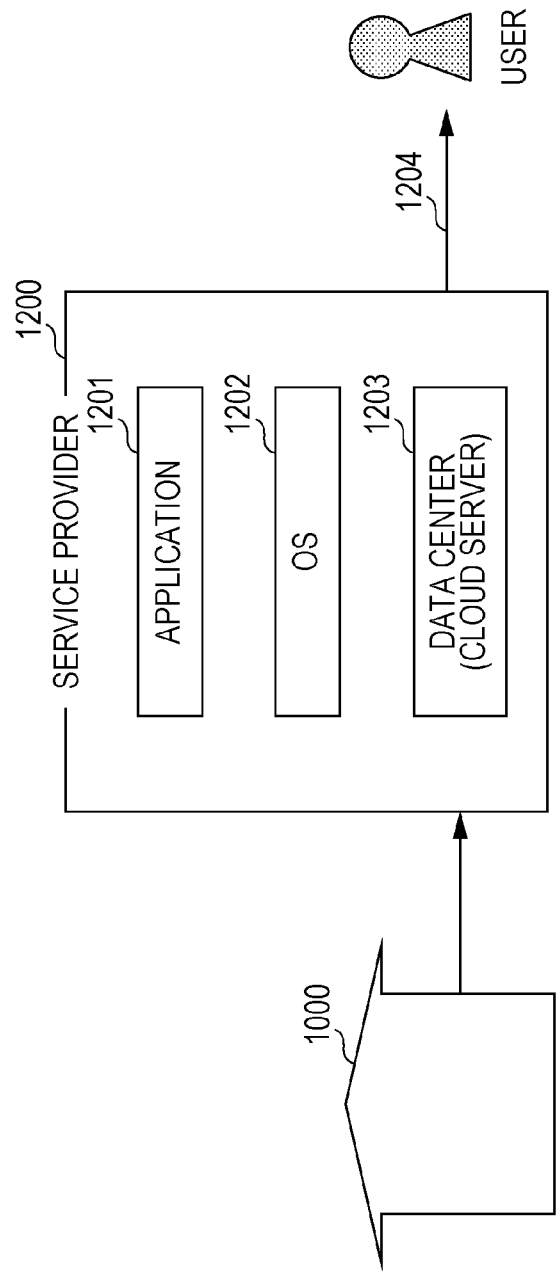
FIG. 14 is a diagram illustrating service type 1 (an inhouse data center type)

FIG. 14 is a diagram illustrating service type 1 (an inhouse data center type).

This type is a type in which a service provider 1200 obtains information from a group 1000 and provides a user with a service. In this type, the service provider 1200 has functions of a data-center operating company. That is, the service provider 1200 has a cloud server 1203 that manages big data. Thus, no data-center operating company exists.

In this type, the service provider 1200 operates and manages a data center (the cloud server 1203). The service provider 1200 manages an operating system (OS) 1202 and an application 1201. The service provider 1200 uses the OS 1202 and the application 1201, managed by the service provider 1200, to provide a service 1204.

(Service Type 2: IaaS Usage Type)

Figure 15:
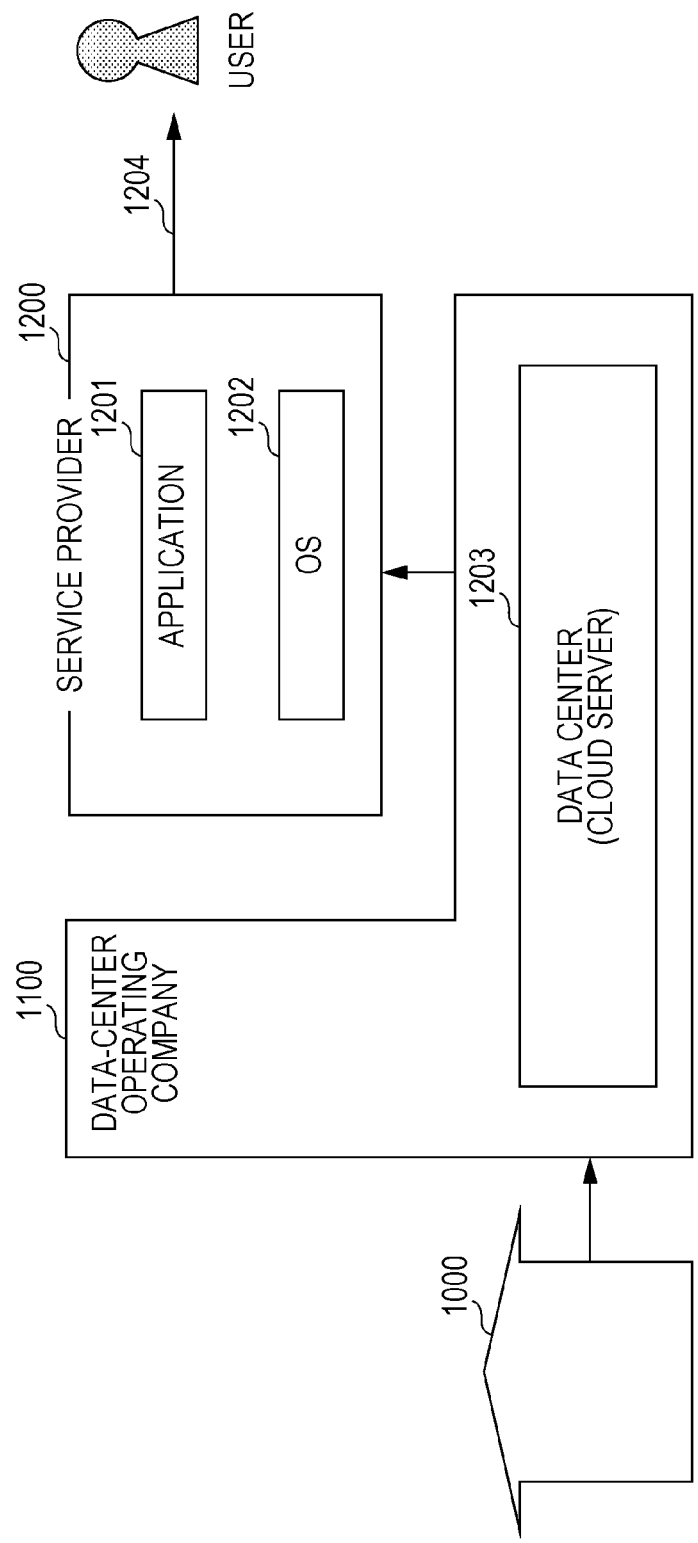
FIG. 15 is a diagram illustrating service type 2 (an IaaS usage type)

FIG. 15 is a diagram illustrating service type 2 (an IaaS usage type).

IaaS is an acronym of Infrastructure as a Service and is a cloud-service-providing model that provides, as a service over the Internet, infrastructure itself for constructing and operating a computer system.

In this type, a data-center operating company 1100 manages a data center (a cloud server 1203). A service provider 1200 manages an OS 1202 and an application 1201. The service provider 1200 uses the OS 1202 and the application 1201, managed by the service provider 1200, to provide a service 1204.

(Service Type 3: PaaS Usage Type)

Figure 16:
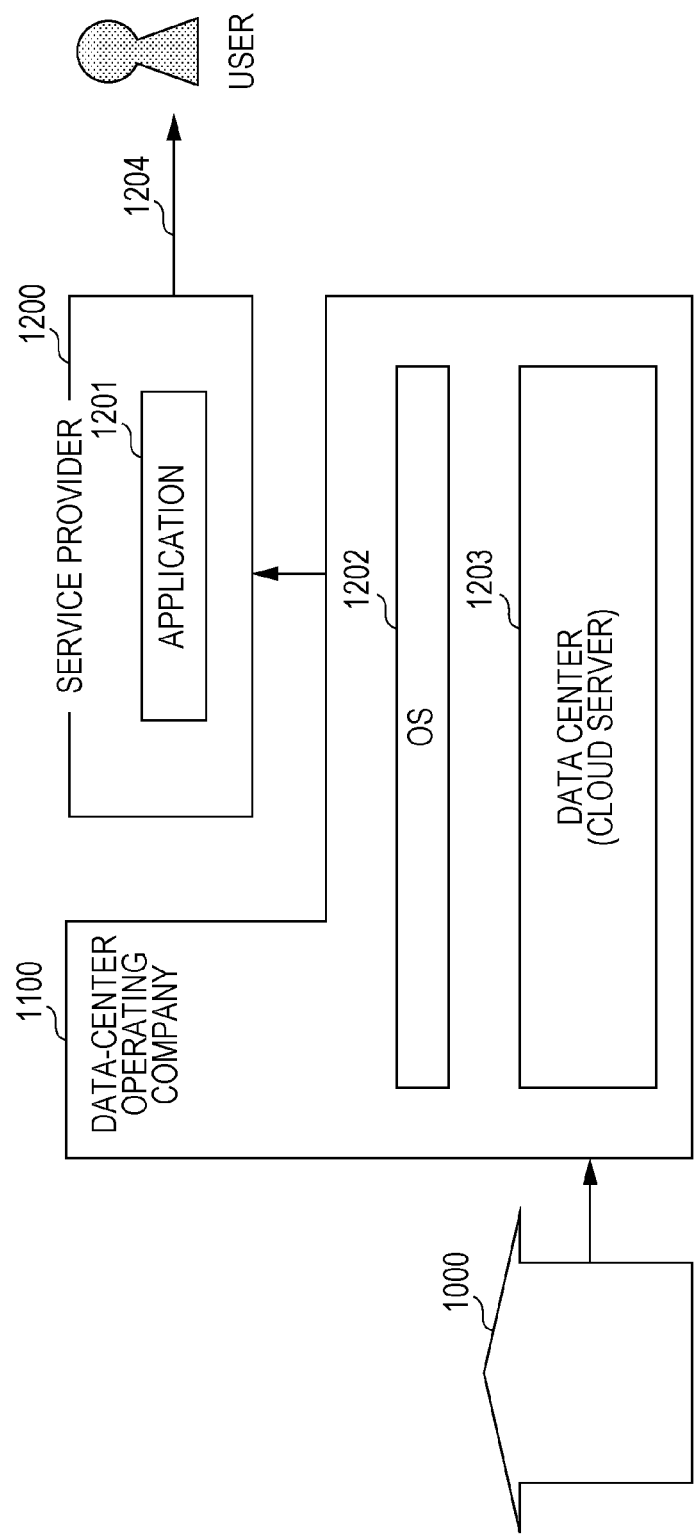
FIG. 16 is a diagram illustrating service type 3 (a PaaS usage type)

FIG. 16 is a diagram illustrating service type 3 (a PaaS usage type).

PaaS is an acronym of Platform as a Service and is a cloud-service-providing model that provides, as a service over the Internet, a platform that serves as a foundation for constructing and operating software.

In this type, a data-center operating company 1100 manages an OS 1202 and operates and manages a data center (a cloud server 1203). A service provider 1200 manages an application 1201. The service provider 1200 uses the OS 1202, managed by the data-center operating company 1100, and the application 1201, managed by the service provider 1200, to provide a service 1204.

(Service Type 4: SaaS Usage Type)

Figure 17:
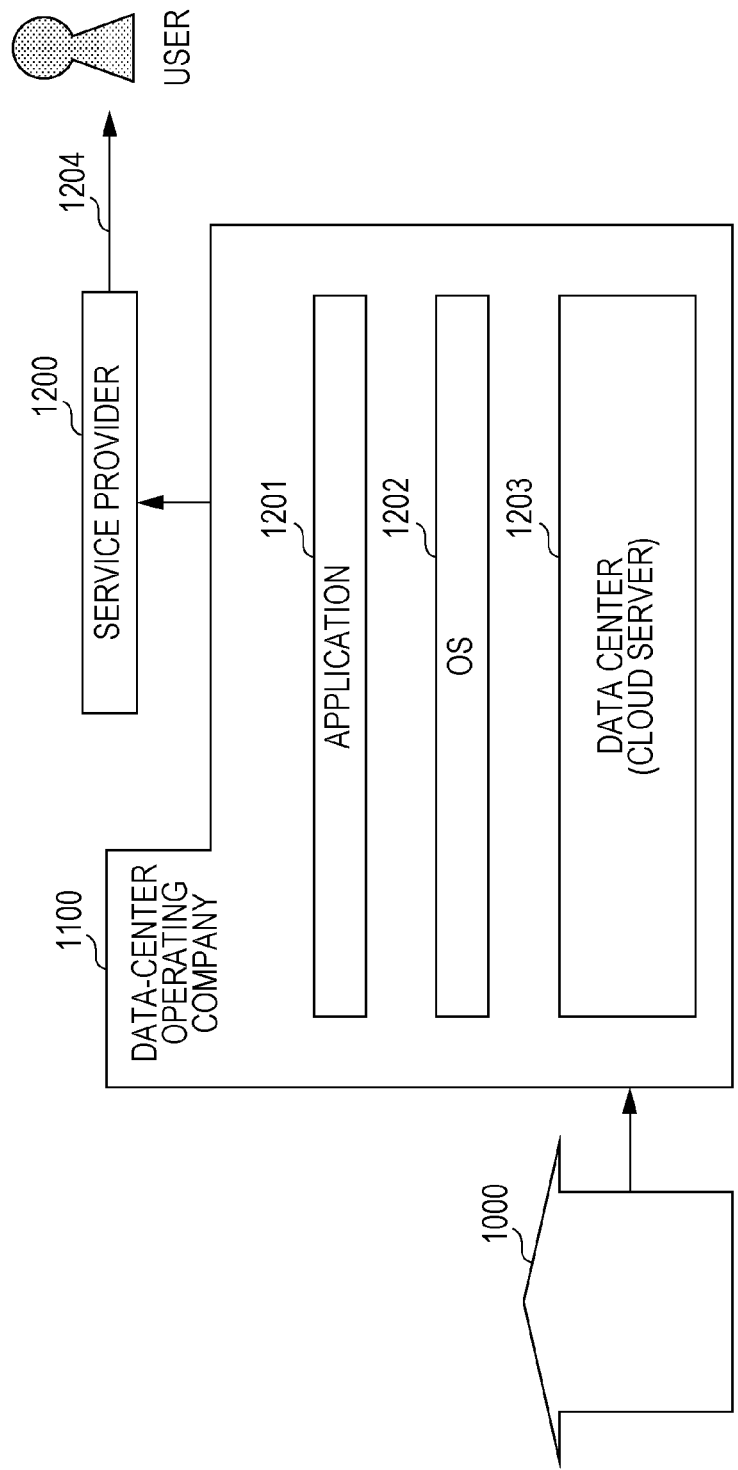
FIG. 17 is a diagram illustrating service type 4 (a SaaS usage type).

FIG. 17 is a diagram illustrating service type 4 (a SaaS usage type).

SaaS is an acronym of Software as a Service. SaaS is a cloud-service-providing model having, for example, a function that allows companies and individuals (users) that do not own a data center (a cloud server) to use, over a network such as the Internet, applications provided by a platform provider that owns a data center (a cloud server).

In this type, a data-center operating company 1100 manages an application 1201 and an OS 1202 and operates and manages a data center 1203 (a cloud server 1110). A service provider 1200 uses the OS 1202 and the application 1201, managed by the data-center operating company 1100, to provide a service 1204.

It is assumed that, in any of the types described above, the service provider 1200 provides a service. Also, for example, the service provider or the data-center operating company may itself develop the OS, the application, a database for big data, or the like or may also entrust the development to a third party. In any of the types described above, a processing-requesting side or a plurality of workers who is a processing-undertaking side may correspond to the user(s).

The present disclosure can be applied to task generation methods, task generation apparatuses, and non-transitory computer-readable recording media storing programs. In particular, the present disclosure can be applied to, in a system in which a processing-requesting side for crowdsourcing or the like makes a request for performing task processing to equipment of a worker who is a processing-undertaking side over a network, a task generation method, a task generation apparatus, and a non-transitory computer-readable recording medium storing a program for generating, by using a computer, a task the worker is requested to perform.

What is claimed is:

1. A task generation method using a computer included in a system in which a request for performing task processing is made to equipment of a worker who is a processing-undertaking side, the task generation method comprising:

receiving worker information from the equipment of the worker over a network, the worker information including first location information piece indicating (i) a location of the equipment when the worker accessed the computer using the equipment or (ii) a location regarding an address of the worker;

calculating, for each of second location information pieces associated with image data pieces, a first degree of association between each of the first location information piece of the worker information and a corresponding second location information piece, wherein each of the image data pieces is a machine-learning image data piece including a subject, wherein the second location information pieces and the image data pieces are stored in a machine-learning data database connected to the computer, wherein each of the second location information pieces indicates a location where a subject in a corresponding image data piece was taken, wherein the first degree of association between the first location information piece and the corresponding second location information piece is calculated based on a distance between the location indicated by the first location information piece and the location indicated by the corresponding second location information piece, wherein the first degree of association is calculated to be higher as the distance decreases, and wherein the first degree of association indicates an ability of the worker to give correct label information to the image data piece associated with the corresponding second location information piece;

extracting, as a specific data piece, one of the image data pieces, wherein a first degree of association between the first location information piece and a second location information piece associated with the one of the image data pieces, which is determined by the calculating, is larger than a predetermined threshold, and wherein the one of the image data pieces extracted as the specific data piece is subjected to the task processing that the worker is requested to perform; and generating a request task for requesting the equipment of the worker to perform task processing for giving label information to the specific data piece by using the equipment of the worker, wherein the request task includes the specific data piece and a plurality of label candidate information pieces, which are options of the label information and which are prepared based on analysis information piece resulting from analysis of the specific data piece, wherein one of the plurality of label candidate information pieces indicates information which is related to a feature of the subject included in the specific data piece, wherein others of the plurality of label candidate information pieces indicate information which is not related to the feature of the subject included in the specific data piece, and wherein the task processing is performed by selecting one of the plurality of label candidate information pieces included in the request task, as the label information given to the specific data piece in the request task, with using the equipment of the worker, the task generation method further comprising:

transmitting the generated request task to the equipment of the worker;

performing the generated request task at the equipment of the worker;

receiving a result of performing the generated request task including the selected one of the label candidate information pieces, as the label information, from the equipment of the worker; and storing the received label information in association with the specific data piece into the machine-learning data database.

2. The task generation method according to claim 1, wherein, in the extracting of the specific data,
   the number of times each of the image data pieces was used to generate a request task in the past is checked, and
   one of the image data pieces whose number of usages is a smaller than a predetermined number and which the first degree of association between the first location information piece and the second location information piece associated with the one of the image data pieces is larger than the predetermined threshold is extracted as the specific data.

3. The task generation method according to claim 1, wherein the worker information further includes at least one of access history of the worker about access to a predetermined web accessible by the computer and upload history of the worker about uploading data to a predetermined social networking service (SNS).

4. The task generation method according to claim 1, wherein each of the image data pieces is a machine-learning image data piece which includes an object or a person as the subject, and the location of the subject in each of the image data pieces is obtained by analyzing a corresponding image data piece.

5. The task generation method according to claim 1, wherein the worker information further includes first age information piece indicating an age of the worker, wherein each of the image data pieces is a machine-learning image data piece which includes a person as the subject, and wherein, the task generation method further includes:

the calculating further calculates, for each of second age information pieces associated with the image data pieces, a second degree of association between the first age information piece of the worker information and a corresponding second age information piece, wherein each of the second age information pieces indicates an age of the person included in a corresponding image data piece, wherein the age of the person included in the corresponding image data piece is obtained by analyzing the corresponding image data piece, wherein the second age information pieces are stored in the machine-learning data database, wherein the second degree of association between the first age information piece and the corresponding second age information piece is calculated based on a difference between the age of worker indicated by the first age information piece and the age of the person indicated by the corresponding second age information piece, and wherein the second degree of association between the first age information piece and the second age information piece is calculated to be higher as the difference decreases, wherein the extracting further extracts, as the specific data piece, one of the image data pieces, wherein a second degree of association between the first age information piece and a second age information piece associated with the one of the image data pieces, which is determined by the calculating of the second degree of association, is larger than a predetermined threshold.

6. The task generation method according to claim 1, wherein the worker information further includes first gender information piece indicating a gender of the worker;

wherein each of the image data pieces is a machine-learning image data piece which includes at least one person as the subject, and wherein, the task generation method further includes:

the calculating further calculates, for each of second gender information pieces associated with the image data pieces, a third degree of association between the first gender information piece of the worker information and a corresponding second gender information piece, wherein each of the second gender information pieces indicates a gender of each of the at least one person included in a corresponding image data piece, wherein the gender of each of the at least one person included in the corresponding image data piece is obtained by analyzing the corresponding image data piece, wherein the second gender information pieces are stored in the machine-learning data database, wherein the third degree of association between the first gender information piece and the corresponding second gender information piece is calculated based on a number of persons whose gender indicated by the corresponding second gender information piece matches the gender of the worker indicated by the first gender information piece, and wherein the third degree of association between the first gender information piece and the corresponding second gender information piece is calculated to be higher as the number of persons whose gender indicated by the corresponding second gender information piece matches the gender of the worker indicated by the first gender information piece increases, wherein the extracting further extracts, as the specific data piece, one of the image data pieces, wherein a third degree of association between the first gender information piece and a second gender information piece corresponding to the one of the image data pieces, which is determined by the calculating of the third degree of association, is larger than a predetermined threshold.

7. A task generation apparatus included in a system in which a request for performing task processing is made to a worker who is a processing-undertaking side, the task generation apparatus comprising:

a receiver that receives worker information from the equipment of the worker over a network, the worker information including first location information piece indicating (i) a location of the equipment when the worker accessed the task generation apparatus using the equipment or (ii) a location regarding an address of the worker;

a memory that stores a program; and a processor that, when executing the program stored in the memory, performs operations including:

calculating, for each of second location information pieces associated with image data pieces, a first degree of association between each of the first location information piece of the worker information and a corresponding second location information piece, wherein each of the image data pieces is a machine-learning image data piece including a subject, wherein the second location information pieces and the image data pieces are stored in a machine-learning data database connected to the task generation apparatus, wherein each of the second location information pieces indicates a location where a subject in a corresponding image data piece was taken, wherein the first degree of association between the first location information piece and the corresponding second location information piece is calculated based on a distance between the location indicated by the first location information piece and the location indicated by the corresponding second location information piece, wherein the first degree of association is calculated to be higher as the distance decreases, and wherein the first degree of association indicates an ability of the worker to give correct label information to the image data piece associated with the corresponding second location information piece;

extracting, as a specific data piece, one of the image data pieces, wherein a first degree of association between the first location information piece and a second location information piece associated with the one of the image data pieces, which is determined by the calculating, is larger than a predetermined threshold, and wherein the one of the image data pieces extracted as the specific data piece is subjected to the task processing that the worker is requested to perform; and generating a request task for requesting the equipment of the worker to perform task processing for giving label information to the specific data piece by using the equipment of the worker, wherein the request task includes the specific data piece and a plurality of label candidate information pieces, which are options of the label information and which are prepared based on analysis information piece resulting from analysis of the specific data piece, wherein one of the plurality of label candidate information pieces indicates information which is related to a feature of the subject included in the specific data piece, wherein others of the plurality of label candidate information pieces indicate information which is not related to the feature of the subject included in the specific data piece, and wherein the task processing is performed by selecting one of the plurality of label candidate information pieces included in the request task, as the label information given to the specific data piece in the request task, with using the equipment of the worker, wherein the processor, when executing the program stored in the memory, further performs operations including:

transmitting the generated request task to the equipment of the worker, to cause the generated request task to be performed at the equipment of the worker;

receiving a result of performing the generated request task, including the selected one of the label candidate information pieces, as the label information, from the equipment of the worker; and storing the received label information in association with the specific data piece into the machine-learning data database.

8. A non-transitory computer-readable recording medium storing a program to be executed by a computer included in a system in which a request for performing task processing is made to equipment of a worker who is a processing-undertaking side, the program causes the computer to execute:

receiving worker information from the equipment of the worker over a network, the worker information including first location information piece indicating (i) a location of the equipment when the worker accessed the computer using the equipment or (ii) a location regarding an address of the worker;

calculating, for each of second location information pieces associated with image data pieces, a first degree of association between each of the first location information piece of the worker information and a corresponding second location information piece, wherein each of the image data pieces is a machine-learning image data piece including a subject, wherein the second location information pieces and the image data pieces are stored in a machine-learning data database connected to the computer, wherein each of the second location information pieces indicates a location where a subject in a corresponding image data piece was taken, wherein the first degree of association between the first location information piece and the corresponding second location information piece is calculated based on a distance between the location indicated by the first location information piece and the location indicated by the corresponding second location information piece, wherein the first degree of association is calculated to be higher as the distance decreases, and wherein the first degree of association indicates an ability of the worker to give correct label information to the image data piece associated with the corresponding second location information piece;

extracting, as a specific data piece, one of the image data pieces, wherein a first degree of association between the first location information piece and a second location information piece associated with the one of the image data pieces, which is determined by the calculating, is larger than a predetermined threshold, and wherein the one of the image data pieces extracted as the specific data piece is subjected to the task processing that the worker is requested to perform; and generating a request task for requesting the equipment of the worker to perform task processing for giving label information to the specific data piece by using the equipment of the worker, wherein the request task includes the specific data piece and a plurality of label candidate information pieces, which are options of the label information and which are prepared based on analysis information piece resulting from analysis of the specific data piece, wherein one of the plurality of label candidate information pieces indicates information which is related to a feature of the subject included in the specific data piece, wherein others of the plurality of label candidate information pieces indicate information which is not related to the feature of the subject included in the specific data piece, and wherein the task processing is performed by selecting one of the plurality of label candidate information pieces included in the request task, as the label information given to the specific data piece in the request task, with using the equipment of the worker, the program further causes the computer to execute:

transmitting the generated request task to the equipment of the worker, to cause the generated request task to be performed at the equipment of the worker;

receiving a result of performing the generated request task, including the selected one of the label candidate information pieces, as the label information, from the equipment of the worker; and storing the received label information in association with the specific data piece into the machine-learning data database.

* * * * *